United States Patent
Kono et al.

(10) Patent No.: US 11,726,628 B2
(45) Date of Patent: *Aug. 15, 2023

(54) DETECTING DEVICE

(71) Applicant: Japan Display Inc., Tokyo (JP)

(72) Inventors: Takaaki Kono, Tokyo (JP); Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,894

(22) Filed: Mar. 28, 2022

(65) Prior Publication Data

US 2022/0326811 A1    Oct. 13, 2022

(30) Foreign Application Priority Data

Mar. 30, 2021    (JP) .................. 2021-058731

(51) Int. Cl.
   *G06F 3/044* (2006.01)
   *G06F 3/041* (2006.01)

(52) U.S. Cl.
   CPC .......... *G06F 3/0446* (2019.05); *G06F 3/0445* (2019.05); *G06F 3/04166* (2019.05)

(58) Field of Classification Search
   CPC ... G06F 3/04166; G06F 3/0445; G06F 3/0446
   USPC ....................................................... 345/174
   See application file for complete search history.

(56) References Cited

U.S. PATENT DOCUMENTS

| | | | | |
|---|---|---|---|---|
| 2014/0327647 | A1* | 11/2014 | Ray | G06F 3/04166 345/174 |
| 2015/0185899 | A1* | 7/2015 | Lee | G06F 3/0445 345/174 |
| 2016/0117049 | A1* | 4/2016 | Sagawai | G06F 3/0446 345/174 |
| 2018/0120993 | A1 | 5/2018 | Kurasawa et al. | |
| 2019/0102039 | A1* | 4/2019 | Uehara | G06V 10/955 |

FOREIGN PATENT DOCUMENTS

JP    2018-073126 A    5/2018

* cited by examiner

*Primary Examiner* — Jimmy H Nguyen
(74) *Attorney, Agent, or Firm* — K&L Gates LLP

(57) ABSTRACT

A detecting device includes a plurality of drive electrodes extending in a first direction and arrayed in a second direction, a detection electrode facing the drive electrodes in a direction orthogonal to the first direction and the second direction, a drive circuit configured to supply a drive signal to the drive electrodes, and a detector configured to detect proximity of an object to a detection region provided with the detection electrode based on an output from the detection electrode generated according to capacitance generated between the drive electrodes and the detection electrode due to the drive signal.

11 Claims, 19 Drawing Sheets

| | PHASE | | | | | | | |
|---|---|---|---|---|---|---|---|---|
| Tx COORDINATE | P1 | P2 | P3 | P4 | P5 | P6 | P7 | P8 |
| A | 1 | 1 | 1 | 1 | -1 | 1 | 1 | -1 |
| B | -1 | -1 | -1 | -1 | 1 | 1 | 1 | 1 |
| C | 1 | -1 | 1 | -1 | -1 | -1 | -1 | -1 |
| D | -1 | 1 | -1 | 1 | 1 | -1 | 1 | -1 |
| E | 1 | 1 | -1 | -1 | -1 | 1 | -1 | 1 |
| F | -1 | -1 | 1 | 1 | 1 | 1 | -1 | -1 |
| G | 1 | -1 | -1 | 1 | -1 | -1 | 1 | 1 |
| H | -1 | 1 | 1 | -1 | 1 | -1 | -1 | 1 |

| | Tx COORDINATE | | | | | | | |
|---|---|---|---|---|---|---|---|---|
| | A | B | C | D | E | F | G | H |
| 1 | A1 | B1 | C1 | D1 | E1 | F1 | G1 | H1 |
| 2 | A2 | B2 | C2 | D2 | E2 | F2 | G2 | H2 |
| 3 | A3 | B3 | C3 | D3 | E3 | F3 | G3 | H3 |
| 4 | A4 | B4 | C4 | D4 | E4 | F4 | G4 | H4 |
| 5 | A5 | B5 | C5 | D5 | E5 | F5 | G5 | H5 |
| 6 | A6 | B6 | C6 | D6 | E6 | F6 | G6 | H6 |
| 7 | A7 | B7 | C7 | D7 | E7 | F7 | G7 | H7 |
| 8 | A8 | B8 | C8 | D8 | E8 | F8 | G8 | H8 |

(Rx COORDINATE along left side; SA denotes the array region)

FIG.6

| Rx COORDINATE | OUTPUT |
|---|---|
| 1 | Op1=A1+B1+C1+D1+E1+F1+G1+H1 |
| 2 | Op2=A2+B2+C2+D2+E2+F2+G2+H2 |
| 3 | Op3=A3+B3+C3+D3+E3+F3+G3+H3 |
| 4 | Op4=A4+B4+C4+D4+E4+F4+G4+H4 |
| 5 | Op5=A5+B5+C5+D5+E5+F5+G5+H5 |
| 6 | Op6=A6+B6+C6+D6+E6+F6+G6+H6 |
| 7 | Op7=A7+B7+C7+D7+E7+F7+G7+H7 |
| 8 | Op8=A8+B8+C8+D8+E8+F8+G8+H8 |

FIG.7

| Tx COORDINATE | PHASE | | | | | | | |
|---|---|---|---|---|---|---|---|---|
| | P1 | P2 | P3 | P4 | P5 | P6 | P7 | P8 |
| A | 1 | 1 | 1 | 1 | -1 | 1 | 1 | -1 |
| B | -1 | -1 | -1 | -1 | 1 | 1 | 1 | 1 |
| C | 1 | -1 | 1 | -1 | -1 | -1 | -1 | -1 |
| D | -1 | 1 | -1 | 1 | 1 | -1 | 1 | -1 |
| E | 1 | 1 | -1 | -1 | -1 | 1 | -1 | 1 |
| F | -1 | -1 | 1 | 1 | 1 | 1 | -1 | -1 |
| G | 1 | -1 | -1 | 1 | -1 | -1 | 1 | 1 |
| H | -1 | 1 | 1 | -1 | 1 | -1 | -1 | 1 |

FIG.8

| Tx COORDINATE | PHASE | | | |
|---|---|---|---|---|
| | P1 | P2 | P3 | P4 |
| A | 1 | 1 | 1 | 1 |
| C | 1 | -1 | 1 | -1 |
| E | 1 | 1 | -1 | -1 |
| G | 1 | -1 | -1 | 1 |

~Had1

FIG.9

| Tx COORDINATE | PHASE | | | |
|---|---|---|---|---|
| | P1 | P2 | P3 | P4 |
| B | -1 | -1 | -1 | -1 |
| D | -1 | 1 | -1 | 1 |
| F | -1 | -1 | 1 | 1 |
| H | -1 | 1 | 1 | -1 |

~Had2

FIG.10

| Tx COORDINATE | PHASE | | | |
|---|---|---|---|---|
| | P5 | P6 | P7 | P8 |
| B | 1 | 1 | 1 | 1 |
| D | 1 | -1 | 1 | -1 |
| F | 1 | 1 | -1 | -1 |
| H | 1 | -1 | -1 | 1 |

~Had1

FIG.11

| Tx COORDINATE | PHASE | | | |
|---|---|---|---|---|
| | P5 | P6 | P7 | P8 |
| C | -1 | -1 | -1 | -1 |
| E | -1 | 1 | -1 | 1 |
| G | -1 | -1 | 1 | 1 |
| A | -1 | 1 | 1 | -1 |

~Had2

FIG.12

| | | \multicolumn{8}{c}{Tx COORDINATE} | | | | | | | |
|---|---|---|---|---|---|---|---|---|---|
| | | A | B | C | D | E | F | G | H |
| Rx COOR-DINATE | 1 | 5 | 5 | 5 | 5 | 5 | 5 | 5 | 5 |
| | 2 | 5 | 5 | 10 | 10 | 10 | 10 | 5 | 5 |
| | 3 | 5 | 5 | 5 | 5 | 5 | 5 | 5 | 5 |
| | 4 | 5 | 5 | 10 | 5 | 5 | 10 | 5 | 5 |
| | 5 | 5 | 5 | 5 | 5 | 5 | 5 | 5 | 5 |
| | 6 | 5 | 5 | 10 | 9 | 8 | 7 | 5 | 5 |
| | 7 | 5 | 5 | 5 | 5 | 5 | 5 | 5 | 5 |
| | 8 | 5 | 5 | 5 | 5 | 5 | 5 | 5 | 5 |

FIG.13

| P1 | | Tx COORDINATE | | | | | | | | OUT-PUT |
|---|---|---|---|---|---|---|---|---|---|---|
| | | A | B | C | D | E | F | G | H | Op |
| Rx COOR-DINATE | 1 | 5 | -5 | 5 | -5 | 5 | -5 | 5 | -5 | 0 |
| | 2 | 5 | -5 | 10 | -10 | 10 | -10 | 5 | -5 | 0 |
| | 3 | 5 | -5 | 5 | -5 | 5 | -5 | 5 | -5 | 0 |
| | 4 | 5 | -5 | 10 | -5 | 5 | -10 | 5 | -5 | 0 |
| | 5 | 5 | -5 | 5 | -5 | 5 | -5 | 5 | -5 | 0 |
| | 6 | 5 | -5 | 10 | -9 | 8 | -7 | 5 | -5 | 2 |
| | 7 | 5 | -5 | 5 | -5 | 5 | -5 | 5 | -5 | 0 |
| | 8 | 5 | -5 | 5 | -5 | 5 | -5 | 5 | -5 | 0 |

FIG.14

| P2 | | Tx COORDINATE | | | | | | | | OUT-PUT |
|---|---|---|---|---|---|---|---|---|---|---|
| | | A | B | C | D | E | F | G | H | Op |
| Rx COOR-DINATE | 1 | 5 | -5 | -5 | 5 | 5 | -5 | -5 | 5 | 0 |
| | 2 | 5 | -5 | -10 | 10 | 10 | -10 | -5 | 5 | 0 |
| | 3 | 5 | -5 | -5 | 5 | 5 | -5 | -5 | 5 | 0 |
| | 4 | 5 | -5 | -10 | 5 | 5 | -10 | -5 | 5 | -10 |
| | 5 | 5 | -5 | -5 | 5 | 5 | -5 | -5 | 5 | 0 |
| | 6 | 5 | -5 | -10 | 9 | 8 | -7 | -5 | 5 | 0 |
| | 7 | 5 | -5 | -5 | 5 | 5 | -5 | -5 | 5 | 0 |
| | 8 | 5 | -5 | -5 | 5 | 5 | -5 | -5 | 5 | 0 |

FIG.15

| P3 | | Tx COORDINATE | | | | | | | | OUT-PUT |
|---|---|---|---|---|---|---|---|---|---|---|
| | | A | B | C | D | E | F | G | H | Op |
| Rx COOR-DINATE | 1 | 5 | -5 | 5 | -5 | -5 | 5 | -5 | 5 | 0 |
| | 2 | 5 | -5 | 10 | -10 | -10 | 10 | -5 | 5 | 0 |
| | 3 | 5 | -5 | 5 | -5 | -5 | 5 | -5 | 5 | 0 |
| | 4 | 5 | -5 | 10 | -5 | -5 | 10 | -5 | 5 | 10 |
| | 5 | 5 | -5 | 5 | -5 | -5 | 5 | -5 | 5 | 0 |
| | 6 | 5 | -5 | 10 | -9 | -8 | 7 | -5 | 5 | 0 |
| | 7 | 5 | -5 | 5 | -5 | -5 | 5 | -5 | 5 | 0 |
| | 8 | 5 | -5 | 5 | -5 | -5 | 5 | -5 | 5 | 0 |

FIG.16

| P4 | | Tx COORDINATE | | | | | | | | OUT-PUT |
|---|---|---|---|---|---|---|---|---|---|---|
| | | A | B | C | D | E | F | G | H | Op |
| Rx COOR-DINATE | 1 | 5 | -5 | -5 | 5 | -5 | 5 | 5 | -5 | 0 |
| | 2 | 5 | -5 | -10 | 10 | -10 | 10 | 5 | -5 | 0 |
| | 3 | 5 | -5 | -5 | 5 | -5 | 5 | 5 | -5 | 0 |
| | 4 | 5 | -5 | -10 | 5 | -5 | 10 | 5 | -5 | 0 |
| | 5 | 5 | -5 | -5 | 5 | -5 | 5 | 5 | -5 | 0 |
| | 6 | 5 | -5 | -10 | 9 | -8 | 7 | 5 | -5 | -2 |
| | 7 | 5 | -5 | -5 | 5 | -5 | 5 | 5 | -5 | 0 |
| | 8 | 5 | -5 | -5 | 5 | -5 | 5 | 5 | -5 | 0 |

FIG.17

| P5 | | Tx COORDINATE | | | | | | | | OUT-PUT |
|---|---|---|---|---|---|---|---|---|---|---|
| | | A | B | C | D | E | F | G | H | Op |
| Rx COOR-DINATE | 1 | -5 | 5 | -5 | 5 | -5 | 5 | -5 | 5 | 0 |
| | 2 | -5 | 5 | -10 | 10 | -10 | 10 | -5 | 5 | 0 |
| | 3 | -5 | 5 | -5 | 5 | -5 | 5 | -5 | 5 | 0 |
| | 4 | -5 | 5 | -10 | 5 | -5 | 10 | -5 | 5 | 0 |
| | 5 | -5 | 5 | -5 | 5 | -5 | 5 | -5 | 5 | 0 |
| | 6 | -5 | 5 | -10 | 9 | -8 | 7 | -5 | 5 | -2 |
| | 7 | -5 | 5 | -5 | 5 | -5 | 5 | -5 | 5 | 0 |
| | 8 | -5 | 5 | -5 | 5 | -5 | 5 | -5 | 5 | 0 |

FIG.18

| P6 | | Tx COORDINATE | | | | | | | | OUT-PUT |
|---|---|---|---|---|---|---|---|---|---|---|
| | | A | B | C | D | E | F | G | H | Op |
| Rx COOR-DINATE | 1 | 5 | 5 | -5 | -5 | 5 | 5 | -5 | -5 | 0 |
| | 2 | 5 | 5 | -10 | -10 | 10 | 10 | -5 | -5 | 0 |
| | 3 | 5 | 5 | -5 | -5 | 5 | 5 | -5 | -5 | 0 |
| | 4 | 5 | 5 | -10 | -5 | 5 | 10 | -5 | -5 | 0 |
| | 5 | 5 | 5 | -5 | -5 | 5 | 5 | -5 | -5 | 0 |
| | 6 | 5 | 5 | -10 | -9 | 8 | 7 | -5 | -5 | -4 |
| | 7 | 5 | 5 | -5 | -5 | 5 | 5 | -5 | -5 | 0 |
| | 8 | 5 | 5 | -5 | -5 | 5 | 5 | -5 | -5 | 0 |

FIG.19

| P7 | | Tx COORDINATE | | | | | | | | OUT-PUT |
|---|---|---|---|---|---|---|---|---|---|---|
| | | A | B | C | D | E | F | G | H | Op |
| Rx COOR-DINATE | 1 | 5 | 5 | -5 | 5 | -5 | -5 | 5 | -5 | 0 |
| | 2 | 5 | 5 | -10 | 10 | -10 | -10 | 5 | -5 | -10 |
| | 3 | 5 | 5 | -5 | 5 | -5 | -5 | 5 | -5 | 0 |
| | 4 | 5 | 5 | -10 | 5 | -5 | -10 | 5 | -5 | -10 |
| | 5 | 5 | 5 | -5 | 5 | -5 | -5 | 5 | -5 | 0 |
| | 6 | 5 | 5 | -10 | 9 | -8 | -7 | 5 | -5 | -6 |
| | 7 | 5 | 5 | -5 | 5 | -5 | -5 | 5 | -5 | 0 |
| | 8 | 5 | 5 | -5 | 5 | -5 | -5 | 5 | -5 | 0 |

FIG.20

| P8 | | Tx COORDINATE | | | | | | | | OUT-PUT |
|---|---|---|---|---|---|---|---|---|---|---|
| | | A | B | C | D | E | F | G | H | Op |
| Rx COOR-DINATE | 1 | -5 | 5 | -5 | -5 | 5 | -5 | 5 | 5 | 0 |
| | 2 | -5 | 5 | -10 | -10 | 10 | -10 | 5 | 5 | -10 |
| | 3 | -5 | 5 | -5 | -5 | 5 | -5 | 5 | 5 | 0 |
| | 4 | -5 | 5 | -10 | -5 | 5 | -10 | 5 | 5 | -10 |
| | 5 | -5 | 5 | -5 | -5 | 5 | -5 | 5 | 5 | 0 |
| | 6 | -5 | 5 | -10 | -9 | 8 | -7 | 5 | 5 | -8 |
| | 7 | -5 | 5 | -5 | -5 | 5 | -5 | 5 | 5 | 0 |
| | 8 | -5 | 5 | -5 | -5 | 5 | -5 | 5 | 5 | 0 |

FIG.21

| | | PHASE | | | |
| --- | --- | --- | --- | --- | --- |
| | | P1 | P2 | P3 | P4 |
| OUTPUT | Op1 | 0 | 0 | 0 | 0 |
| | Op2 | 0 | 0 | 0 | 0 |
| | Op3 | 0 | 0 | 0 | 0 |
| | Op4 | 0 | -10 | -10 | 0 |
| | Op5 | 0 | 0 | 0 | 0 |
| | Op6 | 2 | 0 | 0 | -2 |
| | Op7 | 0 | 0 | 0 | 0 |
| | Op8 | 0 | 0 | 0 | 0 |

~MaA

FIG.22

| | | Tx COORDINATE | | | |
| --- | --- | --- | --- | --- | --- |
| | | P5 | P6 | P7 | P8 |
| OUTPUT | Op1 | 0 | 0 | 0 | 0 |
| | Op2 | 0 | 0 | -10 | -10 |
| | Op3 | 0 | 0 | 0 | 0 |
| | Op4 | 0 | 0 | -10 | -10 |
| | Op5 | 0 | 0 | 0 | 0 |
| | Op6 | -2 | -4 | -6 | -8 |
| | Op7 | 0 | 0 | 0 | 0 |
| | Op8 | 0 | 0 | 0 | 0 |

~MaB

FIG.23

|  | | Tx COORDINATE | | | |
|---|---|---|---|---|---|
|  | | A-B | C-D | E-F | G-H |
| Rx COOR-DINATE | 1 | 0 | 0 | 0 | 0 |
| | 2 | 0 | 0 | 0 | 0 |
| | 3 | 0 | 0 | 0 | 0 |
| | 4 | 0 | 5 | -5 | 0 |
| | 5 | 0 | 0 | 0 | 0 |
| | 6 | 0 | 1 | 1 | 0 |
| | 7 | 0 | 0 | 0 | 0 |
| | 8 | 0 | 0 | 0 | 0 |

|  | | Tx COORDINATE | | | |
|---|---|---|---|---|---|
|  | | B-C | D-E | F-G | H-A |
| Rx COOR-DINATE | 1 | 0 | 0 | 0 | 0 |
| | 2 | -5 | 0 | 5 | 0 |
| | 3 | 0 | 0 | 0 | 0 |
| | 4 | -5 | 0 | 5 | 0 |
| | 5 | 0 | 0 | 0 | 0 |
| | 6 | -5 | 1 | 2 | 0 |
| | 7 | 0 | 0 | 0 | 0 |
| | 8 | 0 | 0 | 0 | 0 |

| | | Tx COORDINATE | | | | | | | |
|---|---|---|---|---|---|---|---|---|---|
| | | $\lambda$ | $\kappa$ | $\theta$ | $\eta$ | $\Delta$ | $\Gamma$ | $\beta$ | $\alpha$ |
| | | H-A | A-B | B-C | C-D | D-E | E-F | F-G | G-H |
| Rx COOR- DINATE | 1 | 0 | 0 | 0 | 0 | 0 | 0 | 0 | 0 |
| | 2 | 0 | 0 | -5 | 0 | 0 | 0 | 5 | 0 |
| | 3 | 0 | 0 | 0 | 0 | 0 | 0 | 0 | 0 |
| | 4 | 0 | 0 | -5 | 5 | 0 | -5 | 5 | 0 |
| | 5 | 0 | 0 | 0 | 0 | 0 | 0 | 0 | 0 |
| | 6 | 0 | 0 | -5 | 1 | 1 | 1 | 2 | 0 |
| | 7 | 0 | 0 | 0 | 0 | 0 | 0 | 0 | 0 |
| | 8 | 0 | 0 | 0 | 0 | 0 | 0 | 0 | 0 |

| | | Tx COORDINATE | | | | | | | |
|---|---|---|---|---|---|---|---|---|---|
| | | $\omega$ | $\nu$ | $\mu$ | $\Omega$ | $\psi$ | $\phi$ | $\sigma$ | $\pi$ |
| | | $\nu+\lambda$ | $\mu+\kappa$ | $\Omega+\theta$ | $\psi+\eta$ | $\phi+\Delta$ | $\sigma+\Gamma$ | $\pi+\beta$ | $\alpha$ |
| Rx COOR- DINATE | 1 | 0 | 0 | 0 | 0 | 0 | 0 | 0 | 0 |
| | 2 | 0 | 0 | 0 | 5 | 5 | 5 | 5 | 0 |
| | 3 | 0 | 0 | 0 | 0 | 0 | 0 | 0 | 0 |
| | 4 | 0 | 0 | 0 | 5 | 0 | 0 | 5 | 0 |
| | 5 | 0 | 0 | 0 | 0 | 0 | 0 | 0 | 0 |
| | 6 | 0 | 0 | 0 | 5 | 4 | 3 | 2 | 0 |
| | 7 | 0 | 0 | 0 | 0 | 0 | 0 | 0 | 0 |
| | 8 | 0 | 0 | 0 | 0 | 0 | 0 | 0 | 0 |

| | | Tx COORDINATE | | | | | | | |
|---|---|---|---|---|---|---|---|---|---|
| | | A | B | C | D | E | F | G | H |
| | | INITIAL VALUE $+\nu$ | INITIAL VALUE $+\mu$ | INITIAL VALUE $+\Omega$ | INITIAL VALUE $+\psi$ | INITIAL VALUE $+\phi$ | INITIAL VALUE $+\sigma$ | INITIAL VALUE $+\pi$ | INITIAL VALUE |
| Rx COOR- DINATE | 1 | 5 | 5 | 5 | 5 | 5 | 5 | 5 | 5 |
| | 2 | 5 | 5 | 10 | 10 | 10 | 10 | 5 | 5 |
| | 3 | 5 | 5 | 5 | 5 | 5 | 5 | 5 | 5 |
| | 4 | 5 | 5 | 10 | 5 | 5 | 10 | 5 | 5 |
| | 5 | 5 | 5 | 5 | 5 | 5 | 5 | 5 | 5 |
| | 6 | 5 | 5 | 10 | 9 | 8 | 7 | 5 | 5 |
| | 7 | 5 | 5 | 5 | 5 | 5 | 5 | 5 | 5 |
| | 8 | 5 | 5 | 5 | 5 | 5 | 5 | 5 | 5 |

| 1 | 1  | 1  | 1  | 1  | 1  | 1  | 1  |
|---|----|----|----|----|----|----|----|
| 1 | -1 | -1 | -1 | 1  | -1 | 1  | 1  |
| 1 | 1  | -1 | -1 | -1 | 1  | -1 | 1  |
| 1 | 1  | 1  | -1 | -1 | -1 | 1  | -1 |
| 1 | -1 | 1  | 1  | -1 | -1 | -1 | 1  |
| 1 | 1  | -1 | 1  | 1  | -1 | -1 | -1 |
| 1 | -1 | 1  | -1 | 1  | 1  | -1 | -1 |
| 1 | -1 | -1 | 1  | -1 | 1  | 1  | -1 |

FIG.31

| 1 | 1  | 1  | 1  | 1  | 1  | 1  | 1  |
|---|----|----|----|----|----|----|----|
| 1 | -1 | 1  | 1  | -1 | 1  | -1 | -1 |
| 1 | -1 | -1 | 1  | 1  | -1 | 1  | -1 |
| 1 | -1 | -1 | -1 | 1  | 1  | -1 | 1  |
| 1 | 1  | -1 | -1 | -1 | 1  | 1  | -1 |
| 1 | -1 | 1  | -1 | -1 | -1 | 1  | 1  |
| 1 | 1  | -1 | 1  | -1 | -1 | -1 | 1  |
| 1 | 1  | 1  | -1 | 1  | -1 | -1 | -1 |

DETECTING DEVICE

CROSS-REFERENCE TO RELATED APPLICATION

This application claims the benefit of priority from Japanese Patent Application No. 2021-058731 filed on Mar. 30, 2021, the entire contents of which are incorporated herein by reference.

BACKGROUND

1. Technical Field

The present disclosure relates to a detecting device.

2. Description of the Related Art

Widely known are touch detecting devices that perform detection by the code division multiplex (CDM) system (e.g., Japanese Patent Application Laid-open Publication No. 2018-73126). With the CDM system, detecting devices drive a plurality of drive electrodes facing detection electrodes simultaneously, thereby facilitating their increasing the sensitivity in touch detection compared with a case where they drive each of the drive electrodes individually.

While there is a demand to further increase the sensitivity of detecting devices, it has been difficult to meet this demand by simply applying the conventional CDM system without any change.

In view of the disadvantage described above, an object of the present disclosure is to provide a detecting device that can perform detection with higher sensitivity.

SUMMARY

A detecting device according to an embodiment of the present disclosure includes a plurality of drive electrodes extending in a first direction and arrayed in a second direction, a detection electrode facing the drive electrodes in a direction orthogonal to the first direction and the second direction, a drive circuit configured to supply a drive signal to the drive electrodes, and a detector configured to detect proximity of an object to a detection region provided with the detection electrode based on an output from the detection electrode generated according to capacitance generated between the drive electrodes and the detection electrode due to the drive signal. The drive circuit performs a predetermined number of phases for simultaneously supplying the drive signal to the drive electrodes in a period of time when the detector performs detection once and performs inversion drive, the predetermined number corresponding to number of drive electrodes supplied with the drive signal, the inversion drive supplying the drive signal having different potentials in units of two of the drive electrodes adjacent to each other and supplying to the drive electrodes in each of the phases, one of a drive signal having a relatively high potential and a drive signal having a relatively low potential based on a positive or negative polarity of a value included in a predetermined matrix, and when one half of the predetermined number of phases is a first drive period, and the other half of the predetermined number of phases not included in the first drive period is a second drive period, a relation between an electric potential of the drive signal and the drive electrodes in the second drive period is a relation obtained by shifting a relation between the electric potential of the drive signal and the drive electrodes in the first drive period by one drive electrode in the second direction.

BRIEF DESCRIPTION OF THE DRAWINGS

FIG. 6 is a diagram of outputs from the respective detection electrodes;

FIG. 7 is a diagram illustrating positive and negative polarities of an electric potential of drive signals supplied to the drive electrodes in phases during a touch detection period as positive and negative values;

FIG. 8 is a diagram illustrating the positive and negative polarities of the electric potential supplied to the drive electrodes at Tx coordinates A, C, E, and G in a first drive period in units of two drive electrodes Tx;

FIG. 9 is a diagram illustrating the positive and negative polarities of the electric potential supplied to the drive electrodes at Tx coordinates B, D, F, and H in the first drive period in units of two drive electrodes Tx;

FIG. 10 is a diagram illustrating the positive and negative polarities of the electric potential supplied to the drive electrodes at Tx coordinates B, D, F, and H in a second drive period in units of two drive electrodes Tx;

FIG. 11 is a diagram illustrating the positive and negative polarities of the electric potential supplied to the drive electrodes at Tx coordinates C, E, G, and A in the second drive period in units of two drive electrodes Tx;

FIG. 12 is a diagram of the relation between signal strength, Tx coordinate, and Rx coordinate obtained in a reference example;

FIG. 13 is a diagram of outputs from the detection electrodes and the signal strengths at the coordinates included in the outputs from the detection electrodes obtained in a phase P1;

FIG. 14 is a diagram of outputs from the detection electrodes and the signal strengths at the coordinates included in the outputs from the detection electrodes obtained in a phase P2;

FIG. 15 is a diagram of outputs from the detection electrodes and the signal strengths at the coordinates included in the outputs from the detection electrodes obtained in a phase P3;

FIG. 16 is a diagram of outputs from the detection electrodes and the signal strengths at the coordinates included in the outputs from the detection electrodes obtained in a phase P4;

FIG. 17 is a diagram of outputs from the detection electrodes and the signal strengths at the coordinates included in the outputs from the detection electrodes obtained in a phase P5;

FIG. 18 is a diagram of outputs from the detection electrodes and the signal strengths at the coordinates included in the outputs from the detection electrodes obtained in a phase P6;

FIG. 19 is a diagram of outputs from the detection electrodes and the signal strengths at the coordinates included in the outputs from the detection electrodes obtained in a phase P7;

FIG. 20 is a diagram of outputs from the detection electrodes and the signal strengths at the coordinates included in the outputs from the detection electrodes obtained in a phase P8;

FIG. 21 is a diagram of a matrix indicating outputs from the detection electrodes in the first drive period;

FIG. 22 is a diagram of a matrix indicating outputs from the detection electrodes in the second drive period;

FIG. 23 is a diagram of a first matrix including the signal strengths of first composite coordinates in the detection region derived based on the matrix illustrated in FIG. 21;

FIG. 24 is a diagram of a second matrix including the signal strengths of first composite coordinates in the detection region derived based on the matrix illustrated in FIG. 22;

FIG. 25 is a diagram of decoding results in a detection region SA calculated based on FIGS. 23 and 24;

FIG. 26 is a diagram of a fourth matrix derived by return processing based on a third matrix;

FIG. 27 is a diagram of touch detection results derived by adding based on the fourth matrix;

FIG. 30 is a diagram of an example of a Hadamard matrix when n=4 is satisfied; and FIG. 31 is a diagram of another example of the Hadamard matrix when n=4 is satisfied.

DETAILED DESCRIPTION

Figure 1:
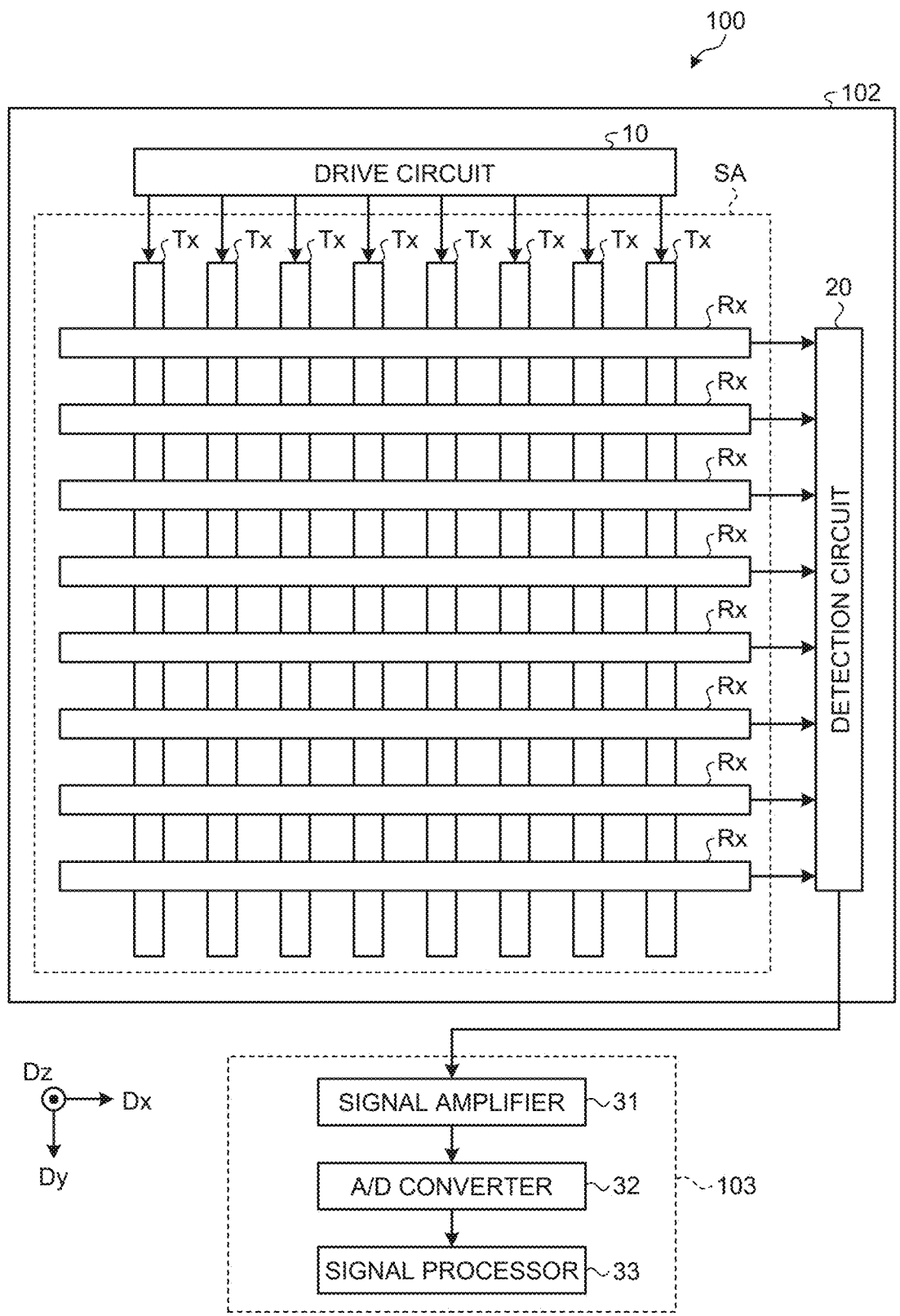
FIG. 1 is a schematic of a main configuration of a detecting device.

Exemplary embodiments according to the present disclosure are described below in greater detail with reference to the accompanying drawings. What is disclosed herein is given by way of example only, and appropriate modifications made without departing from the spirit of the present invention and easily conceivable by those skilled in the art naturally fall within the scope of the present disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the drawings, components similar to those previously described with reference to previous drawings are denoted by like reference numerals, and detailed explanation thereof may be omitted as appropriate.

FIG. 1 is a schematic of a main configuration of a detecting device 100. The detecting device 100 includes a touch panel 102 and a detector (detection signal processing circuit) 103. The touch panel 102 has a detection region SA provided with a plurality of drive electrodes Tx and a plurality of detection electrodes Rx. In the following description, one of two directions orthogonal to each other along the detection region SA is referred to as a first direction Dy, and the other is referred to as a second direction Dx. The direction orthogonal to the first direction Dy and the second direction Dx is referred to as a third direction Dz.

The drive electrodes Tx are electrodes extending along the first direction Dy. The drive electrodes Tx are arrayed in the second direction Dx. The drive electrodes Tx adjacent to each other in the second direction Dx are parallel to each other. The detection electrode Rx is an electrode extending along the second direction Dx. The detection electrodes Rx are arrayed in the first direction Dy. The detection electrodes Rx adjacent to each other in the first direction Dy are parallel to each other. The drive electrodes Tx and the detection electrodes Rx face in the third direction Dz in a manner separated from each other. The distance between the drive electrodes Tx and the detection electrodes Rx is large enough to accumulate capacitance Cap (refer to FIG. 2) between the drive electrodes Tx and the detection electrodes Rx.

The drive electrodes Tx are individually coupled to a drive circuit 10. The drive circuit 10 is a circuit that supplies drive signals to the drive electrodes Tx. The drive signal is an alternating current (AC) square wave Sg, which will be described later, for example (refer to FIG. 2). The detection electrodes Rx are individually coupled to a detection circuit 20. The detection circuit 20 is a circuit that individually acquires, from the detection electrodes Rx, electrical signals generated depending on the magnitude of the capacitance Cap formed between the drive electrodes Tx and the detection electrodes Rx due to the drive signals output to the drive electrodes Tx. The electrical signal is a voltage signal, which will be described later, for example.

Figure 2:
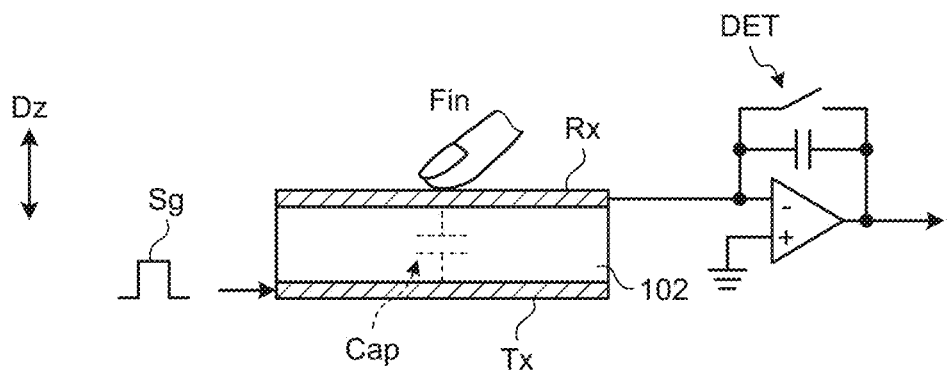
FIG. 2 is a diagram for explaining a basic principle of mutual capacitive touch detection.

The detecting device 100 performs touch control based on a basic principle of capacitive touch detection. The following describes the basic principle of mutual capacitive touch detection performed by the detecting device 1 according to the present embodiment with reference to FIG. 2. FIG. 2 is a diagram for explaining the basic principle of mutual capacitive touch detection.

As illustrated in FIG. 2, the touch panel 102 includes a pair of electrodes arranged facing each other, that is, the drive electrode Tx and the detection electrode Rx. The drive electrode Tx is coupled to an AC signal source (drive signal source). The detection electrode Rx is coupled to a voltage detector DET. The drive signal source according to the embodiment is the drive circuit 10. The voltage detector DET is a circuit included in the detection circuit 20 illustrated in FIG. 1, for example.

The AC signal source supplies the AC square wave Sg at a predetermined frequency (e.g., a frequency of the order of several kilohertz to several hundred kilohertz) to the drive electrode Tx. An electric current corresponding to the capacitance value of the capacitance Cap between the drive electrode Tx and the detection electrode Rx flows through the voltage detector DET. The voltage detector DET converts fluctuations in electric current due to the AC square wave Sg into fluctuations in voltage.

When an external object, such as a finger Fin, that comes close to the touch panel 102 and affects the capacitance Cap comes into contact with the detection electrode Rx or comes close enough to be considered in contact therewith, fringe lines of electric force between the drive electrode Tx and the detection electrode Rx are blocked by the object. As described above, the external object affects the capacitance Cap.

The amplitude of a voltage signal serving as an analog signal output from the voltage detector DET becomes smaller as unevenness or the like on the finger Fin come closer to a contact state than to a non-contact state. The magnitude of the amplitude of this voltage difference corresponds to the magnitude of the value of a digital signal, which will be described later. The detection circuit 20 outputs the voltage signal to the detector 103.

The detector 103 has a function of determining whether an object to be detected is in a non-contact state or in a contact or proximity state based on the voltage signal described above. In this manner, the detecting device 100 can detect a touch based on the basic principle of mutual capacitive touch detection. The "contact state" includes a state where a finger is in contact with a detection surface or in proximity to the detection surface close enough to be considered in contact therewith. The "non-contact state" includes a state where a finger is neither in contact with the detection surface nor in proximity to the detection surface close enough to be considered in contact therewith.

Figure 3:
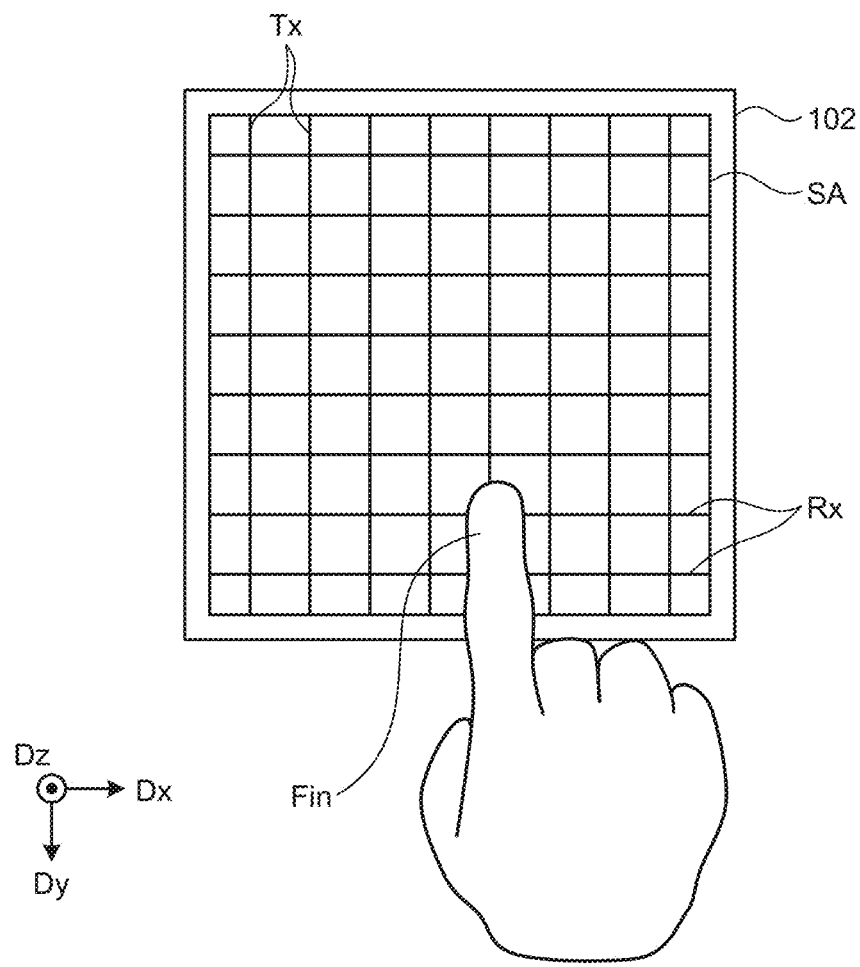
FIG. 3 is a schematic of an example of proximity of a finger to a touch panel.

FIG. 3 is a schematic of an example of proximity of the finger Fin to the touch panel 102. As illustrated in FIG. 3, when the finger Fin comes into proximity to the touch panel 102 at a position overlapping one of intersections of the drive electrodes Tx and the detection electrodes Rx in planar view, the capacitance Cap at the intersection has a capacitance value obtained when the finger Fin is in proximity. By contrast, the capacitance Cap at the other intersections has a capacitance value in the non-contact state. Based on the difference in capacitance values, the detecting device 100 can detect proximity of an external object, such as the finger Fin, to the detection region SA. The planar view is a point of view for viewing, from the front, the plane along which the second direction Dx and the first direction Dy extend.

While the touch panel 102 is a glass substrate, for example, it is not limited thereto. The touch panel 102 may have any desired configuration as long as it enables the drive electrodes Tx and the detection electrodes Rx to be arranged facing each other in the third direction Dz and to have a space between the drive electrodes Tx and the detection electrodes Rx large enough to form the capacitance Cap therebetween by supplying the drive signals to the drive electrodes Tx.

As illustrated in FIG. 1, the detector 103 includes a signal amplifier 31, an A/D converter 32, and a signal processor 33. The signal amplifier 31 is an amplification circuit that amplifies voltage signals output from the detection circuit 20. The A/D converter 32 is a circuit that receives analog voltage signals amplified by the signal amplifier 31 and generates digital signals indicating the value corresponding to the amplitude of the voltage signals. The A/D converter 32 functions as what is called an analog-to-digital (A/D) conversion circuit. The signal processor 33 is a circuit that performs various kinds of processing relating to touch detection in the detection region SA based on the digital signals generated by the A/D converter 32. In the following description, the term "touch detection signal" refers to a signal indicating a touch detection result in the detection region SA derived by the signal processor 33 based on the digital signal generated by the A/D converter 32. The detector 103 may be provided to the touch panel 102 or to other components coupled to the detection circuit 20. Examples of the other components include, but are not limited to, a flexible printed circuit board provided extending from the touch panel 102.

Before explaining specific contents of processing performed by the signal processor 33, coordinates in the detection region SA according to the embodiment are described below with reference to FIGS. 4 and 5.

Figure 4:
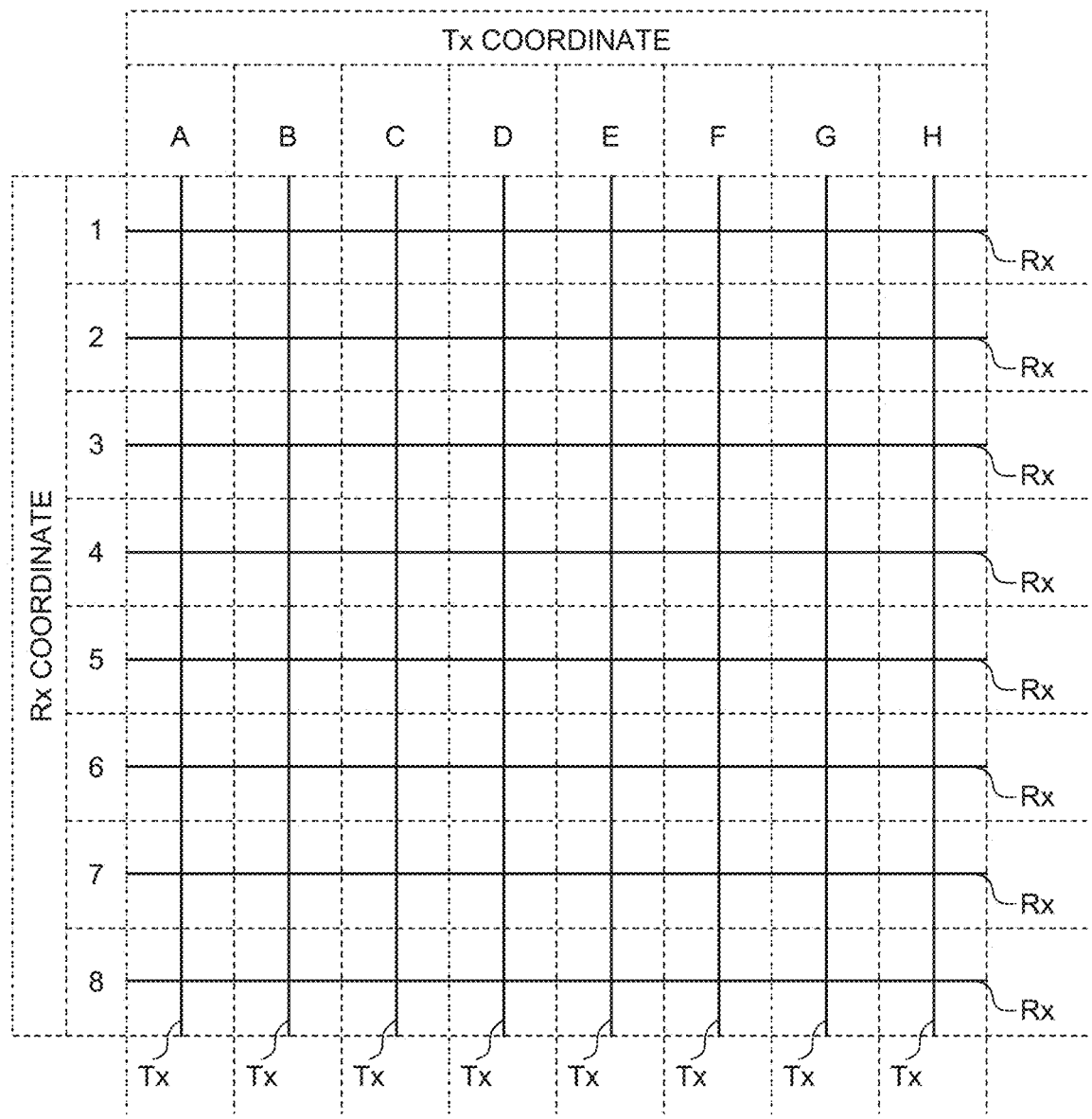
FIG. 4 is a diagram of an example of individual coordinates assigned to a plurality of drive electrodes and a plurality of detection electrodes.

FIG. 4 is a diagram of an example of individual coordinates assigned to the drive electrodes Tx and the detection electrodes Rx. FIG. 4 illustrates coordinates A, B, C, D, E, F, G, and H individually assigned to the drive electrodes Tx arrayed in the second direction Dx. Because the drive electrodes Tx extend in the first direction Dy, each drive electrode Tx does not extend to the positions provided with the other drive electrodes Tx. In the example illustrated in FIG. 4, the coordinates A, B, C, D, E, F, G, and H can be used as coordinates (Tx coordinates) in the second direction Dx at which the drive electrodes Tx are individually arranged. FIG. 4 also illustrates coordinates 1, 2, 3, 4, 5, 6, 7, and 8 individually assigned to the detection electrodes Rx arrayed in the first direction Dy. Because the detection electrodes Rx extend in the second direction Dx, each detection electrode Rx does not extend to the positions provided with the other detection electrodes Rx. In the example illustrated in FIG. 4, the coordinates 1, 2, 3, 4, 5, 6, 7, and 8 can be used as coordinates (Rx coordinates) in the first direction Dy at which the detection electrodes Rx are individually arranged.

As described above, the positions of the respective drive electrodes Tx can be represented by the coordinates (A, B, C, D, E, F, G, and H) in the second direction Dx. Each drive electrode Tx intersects the detection electrodes Rx in planar view. The positions where each drive electrode Tx intersects the detection electrodes Rx can be represented by the coordinates (1, 2, 3, 4, 5, 6, 7, and 8) in the second direction Dx. Consequently, the position where one of the drive electrodes Tx intersects one of the detection electrodes Rx can be represented by a combination of the coordinate in the second direction Dx and the coordinate in the first direction Dy.

Figure 5:
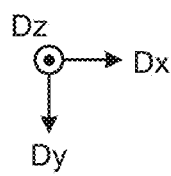
FIG. 5 is a diagram of an example of coordinates in a detection region corresponding to respective coordinates of the drive electrodes and the detection electrodes illustrated in FIG. 4.

FIG. 5 is a diagram of an example of coordinates in the detection region SA corresponding to the respective coordinates of the drive electrodes Tx and the detection electrodes Rx illustrated in FIG. 4. The detection region SA includes a plurality of partial regions that can each be represented by a combination of the coordinate in the second direction Dx and the coordinate in the first direction Dy. FIG. 5 illustrates coordinates A1, A2, . . . , A8, B1, B2, . . . , B8, C1, C2, . . . , C8, D1, D2, . . . , D8, E1, E2, . . . , E8, F1, F2, . . . , F8, G1, G2, . . . , G8, H1, H2, . . . , and H8 as the coordinates of the partial regions. The partial regions have different combinations of the drive electrode Tx and the detection electrode Rx intersecting each other. The partial region at the coordinates A1, for example, is a partial region in which the drive electrode Tx assigned the coordinate A and the detection electrode Rx assigned the coordinate 1 in FIG. 4 intersect each other. Consequently, the coordinates A1 are represented by the combination of the Tx coordinate A and the Rx coordinate 1. While the coordinates A1 has been described as an example, the same rule applies to the coordinates A2, . . . , and H8 other than the coordinates A1.

The number of drive electrodes Tx illustrated in FIG. 4 is $8=2^3$. The number of detection electrodes Rx illustrated in FIG. 4 is $8=2^3$. The number of partial regions illustrated in FIG. 5 is $64=8\times8=2^6$. If the numbers of drive electrodes Tx and detection electrodes Rx are $2^n$, the number of partial regions is $2^{(2n)}$.

While the explanation below with reference to FIGS. 6 to 23 is based on the coordinates A1, . . . , and H8 of the partial regions described with reference to FIGS. 4 and 5, this is given by way of example of the case where the numbers of drive electrodes Tx and detection electrodes Rx are 8. In other words, the numbers of drive electrodes Tx and detection electrodes Rx according to the embodiment are not limited to eight. The alphabets and the numerical values used as the coordinates are given by way of example only and are not intended to limit the coordinate management according to the present disclosure.

The embodiment simultaneously supplies the drive signals to the drive electrodes Tx. As a result, each detection electrode Rx is brought into a state of having the capacitance Cap between the detection electrode Rx and the drive electrodes Tx. The electrical signal received by the detection circuit 20 from each detection electrode Rx is an electrical signal obtained from the detection electrode Rx in this state. The electrical signal can be considered as an output from the detection electrode Rx in terms of the detection circuit 20. The "output from the detection electrode Rx" in the following description refers to a signal digitized by the A/D converter 32 based on an electrical signal (analog signal) obtained by the detection circuit 20 from the detection electrode Rx.

FIG. 6 is a diagram of outputs from the respective detection electrodes Rx. In the following description, an output from the detection electrode Rx at the Rx coordinate 1 (refer to FIG. 4) is referred to as an output Op1. The embodiment simultaneously supplies the drive signals to the drive electrodes Tx as described above. Consequently, the output Op1 is the sum of the capacitance Cap at the coordinates A1, the capacitance Cap at the coordinates B1, the capacitance Cap at the coordinates C1, the capacitance Cap at the coordinates D1, the capacitance Cap at the coordinates E1, the capacitance Cap at the coordinates F1, the capacitance Cap at the coordinates G1, and the capacitance Cap at the coordinates H1. In FIG. 6, this is described in the form of an expression of "Op1=A1+B1+C1+D1+E1+F1+G1+H1". As described above, FIG. 6 illustrates the output from the detection electrode Rx at each Rx coordinate in the form of an expression.

Similarly, in the following description, an output from the detection electrode Rx at the Rx coordinate 2 (refer to FIG. 4) is referred to as an output Op2. An output from the detection electrode Rx at the Rx coordinate 3 (refer to FIG. 4) is referred to as an output Op3. An output from the detection electrode Rx at the Rx coordinate 4 (refer to FIG. 4) is referred to as an output Op4. An output from the detection electrode Rx at the Rx coordinate 5 (refer to FIG. 4) is referred to as an output Op5. An output from the detection electrode Rx at the Rx coordinate 6 (refer to FIG. 4) is referred to as an output Op6. An output from the detection electrode Rx at the Rx coordinate 7 (refer to FIG. 4) is referred to as an output Op7. An output from the detection electrode Rx at the Rx coordinate 8 (refer to FIG. 4) is referred to as an output Op8.

When the value of the Rx coordinate (one of the natural numbers from 1 to 8) is r, the output from the detection electrode Rx is the sum of the capacitance Cap of the eight partial regions (Ar, Br, Cr, Dr, Er, Fr, Gr, and Hr) on the Rx coordinate r. In FIG. 6, this is described in the form of an expression of "Opr=Ar+Br+Cr+Dr+Er+Fr+Gr+Hr".

FIG. 7 is a diagram illustrating positive and negative polarities of the electric potential of the drive signals supplied to the drive electrodes Tx in phases during a touch detection period as positive and negative values. The touch detection period is a period for supplying the drive signals to the drive electrodes Tx to detect proximity of an external object (e.g., the finger Fin) to the detection region SA. In other words, outputs from the detection electrodes Rx are generated in the touch detection period, and touch detection is performed based on the outputs. The touch detection period according to the embodiment includes eight phases.

In FIG. 7, the eight phases are illustrated as phases P1, P2, P3, P4, P5, P6, P7, and P8. The drive circuit 10 performs a predetermined number of phases for simultaneously supplying the drive signals to the drive electrodes in a period of time when the detector 103 performs detection once. The predetermined number corresponds to the number of drive electrodes.

In each phase, the drive electrode Tx is supplied with a positive potential or a negative potential as the drive signal. In FIG. 7, the positive potential is represented by 1. In FIG. 7, the negative potential is represented by −1. In the following description, a "positive (1) potential" refers to the positive potential serving as the drive signal supplied from the drive circuit 10 to the drive electrode Tx. A "negative (−1) potential" refers to the negative potential serving as the drive signal supplied from the drive circuit 10 to the drive electrode Tx.

The embodiment uses the potential difference between a reference potential and the positive (1) potential higher than the reference potential as a reference. The embodiment defines, as the negative (−1) potential, an electric potential (absolute value) lower than the reference potential and equivalent to the positive (1) potential in terms of the capacitance Cap generated by the potential difference. Here, the absolute value represents that the value indicating the electric potential between the reference potential and the positive (1) potential and the value indicating the electric potential between the reference potential and the negative (−1) potential are equivalent. The embodiment, for example, defines an electric potential higher than the reference potential by a predetermined potential as the positive (1) potential and defines an electric potential lower by the predetermined potential as the negative (−1) potential. More specifically, the embodiment defines, as the reference potential, an electric potential of the detection electrode Rx when no drive signal is supplied to the drive electrodes Tx. The positive (1) potential is the higher one of two electric potentials for generating equivalent capacitance Cap between the drive electrodes Tx and the detection electrode Rx when the drive signals are supplied to the drive electrodes Tx, and the negative (−1) potential is the lower one. While the reference potential is the ground potential, for example, it is not limited thereto. The reference potential can be changed as appropriate.

As illustrated in FIG. 7, in the phase P1, the drive electrodes Tx at the Tx coordinates A, C, E, and G are supplied with the positive (1) potential, and the drive electrodes Tx at the Tx coordinates B, D, F, and H are supplied with the negative (−1) potential. In the phase P2, the drive electrodes Tx at the Tx coordinates A, D, E, and H are supplied with the positive (1) potential, and the drive electrodes Tx at the Tx coordinates B, C, F, and G are supplied with the negative (−1) potential. In the phase P3, the drive electrodes Tx at the Tx coordinates A, C, F, and H are supplied with the positive (1) potential, and the drive electrodes Tx at the Tx coordinates B, D, E, and G are supplied with the negative (−1) potential. In the phase P4, the drive electrodes Tx at the Tx coordinates A, D, F, and G are supplied with the positive (1) potential, and the drive electrodes Tx at the Tx coordinates B, C, E, and H are supplied with the negative (−1) potential. In the phase P5, the drive electrodes Tx at the Tx coordinates B, D, F, and H are supplied with the positive (1) potential, and the drive electrodes Tx at the Tx coordinates A, C, E, and G are supplied with the negative (−1) potential. In the phase P6, the drive electrodes Tx at the Tx coordinates A, B, E, and F are supplied with the positive (1) potential, and the drive electrodes Tx at the Tx coordinates C, D, G, and H are supplied with the negative (−1) potential. In the phase P7, the drive electrodes Tx at the Tx coordinates A, B, D, and G are supplied with the positive (1) potential, and the drive electrodes Tx at the Tx coordinates C, E, F, and H are supplied with the negative (−1) potential. In the phase P8, the drive electrodes Tx at the Tx coordinates B, E, G, and H are supplied with the positive (1) potential, and the drive electrodes Tx at the Tx coordinates A, C, D, and F are supplied with the negative (−1) potential.

The embodiment defines half of the phases (e.g., the phases P1, P2, P3, P4, P5, P6, P7, and P8) as a first drive period and the other half as a second drive period. The first drive period includes the phases performed relatively earlier (e.g., the phases P1, P2, P3, and P4), for example. The second drive period includes the phases performed relatively later (e.g., the phases P5, P6, P7, and P8), for example. The execution order of the first drive period and the second drive period may be reversed. The execution order of the phases in each of the first drive period and the second drive period may be any desired order and can be changed as appropriate.

FIG. 8 is a diagram illustrating the positive and negative polarities of the electric potential supplied to the drive electrodes Tx at Tx coordinates A, C, E, and G in the first drive period in units of two drive electrodes Tx. When the drive electrodes Tx at the Tx coordinates A, C, E, and G are arranged in rows, and the phases P1 to P4 are arranged in columns as illustrated in FIG. 8, the matrix indicating the positive and negative polarities of the electric potential of the drive signals supplied to the drive electrodes Tx in the phases is a Hadamard matrix Had1. A Hadamard matrix is a square matrix the elements of which are either 1 or −1 and the rows of which are orthogonal each other. The Hadamard matrix Had1 illustrated in FIG. 8 is a Hadamard matrix where both the number of row elements (combinations of the drive electrodes Tx) and the number of column elements (phases) are $4=2^2=2^{(n-1)}$.

Specifically, the drive electrode Tx at the Tx coordinate A is supplied with the positive (1) potential in the phases P1, P2, P3, and P4. The drive electrode Tx at the Tx coordinate C is supplied with the positive (1) potential in the phases P1 and P3 and with the negative (−1) potential in the phases P2 and P4. The drive electrode Tx at the Tx coordinate E is supplied with the positive (1) potential in the phases P1 and P2 and with the negative (−1) potential in the phases P3 and P4. The drive electrode Tx at the Tx coordinate G is supplied with the positive (1) potential in the phases P1 and P4 and with the negative (−1) potential in the phases P2 and P3.

FIG. 9 is a diagram illustrating the positive and negative polarities of the electric potential supplied to the drive electrodes Tx at the Tx coordinates B, D, F, and H in the first drive period in units of two drive electrodes Tx. When the drive electrodes Tx at the Tx coordinates B, D, F, and H are arranged in rows, and the phases P1 to P4 are arranged in columns as illustrated in FIG. 9, the matrix indicating the positive and negative polarities of the electric potential of the drive signals supplied to the drive electrodes Tx in the phases is a Hadamard matrix Had2 obtained by inverting the positive and negative polarities of the Hadamard matrix Had1.

Specifically, the drive electrode Tx at the Tx coordinate B is supplied with the negative (−1) potential in the phases P1, P2, P3, and P4. The drive electrode Tx at the Tx coordinate D is supplied with the negative (−1) potential in the phases P1 and P3 and with the positive (1) potential in the phases P2 and P4. The drive electrode Tx at the Tx coordinate F is supplied with the negative (−1) potential in the phases P1 and P2 and with the positive (1) potential in the phases P3 and P4. The drive electrode Tx at the Tx coordinate H is supplied with the negative (−1) potential in the phases P1 and P4 and with the positive (1) potential in the phases P2 and P3.

As illustrated in FIG. 7 and comparison between FIGS. 8 and 9, the positive and negative polarities of the electric potential of the drive signals supplied to the drive electrode at the Tx coordinate A are opposite to those of the electric potential of the drive signals supplied to the drive electrode at the Tx coordinate B in each of phases P1 to P4. The positive and negative polarities of the electric potential of the drive signals supplied to the drive electrode at the Tx coordinate C are opposite to those of the electric potential of the drive signals supplied to the drive electrode at the Tx coordinate D in each of phases P1 to P4. The positive and negative polarities of the electric potential of the drive signals supplied to the drive electrode at the Tx coordinate E are opposite to those of the electric potential of the drive signals supplied to the drive electrode at the Tx coordinate F in each of phases P1 to P4. The positive and negative polarities of the electric potential of the drive signals supplied to the drive electrode at the Tx coordinate G are opposite to those of the electric potential of the drive signals supplied to the drive electrode at the Tx coordinate H in each of phases P1 to P4. As described above, there are combinations of two drive electrodes Tx adjacent to each other and having opposite positive and negative polarities of the electric potential of the drive signals supplied thereto in each phase. As described above, the drive circuit 10 according to the embodiment performs inversion drive. The inversion drive defines the two drive electrodes Tx adjacent to each other as a pair and makes the positive and negative polarities of one and the other of the pair opposite to each other.

FIG. 10 is a diagram illustrating the positive and negative polarities of the electric potential supplied to the drive electrodes Tx at the Tx coordinates B, D, F, and H in the second drive period in units of two drive electrodes Tx. When the drive electrodes Tx at the Tx coordinates B, D, F, and H are arranged in rows, and the phases P5 to P8 are arranged in columns as illustrated in FIG. 10, the matrix indicating the positive and negative polarities of the electric potential of the drive signals supplied to the drive electrodes Tx in the phases is the Hadamard matrix Had1.

Specifically, the drive electrode Tx at the Tx coordinate B is supplied with the positive (1) potential in the phases P5, P6, P7, and P8. The drive electrode Tx at the Tx coordinate D is supplied with the positive (1) potential in the phases P5 and P7 and with the negative (−1) potential in the phases P6 and P8. The drive electrode Tx at the Tx coordinate F is supplied with the positive (1) potential in the phases P5 and P6 and with the negative (−1) potential in the phases P7 and P8. The drive electrode Tx at the Tx coordinate H is supplied with the positive (1) potential in the phases P5 and P8 and with the negative (−1) potential in the phases P6 and P7.

FIG. 11 is a diagram illustrating the positive and negative polarities of the electric potential supplied to the drive electrodes Tx at the Tx coordinates C, E, G, and A in the second drive period in units of two drive electrodes Tx. When the drive electrodes Tx at the Tx coordinates C, E, G, and A are arranged in rows, and the phases P5 to P8 are arranged in columns as illustrated in FIG. 11, the matrix indicating the positive and negative polarities of the electric potential of the drive signals supplied to the drive electrodes Tx in the phases is the Hadamard matrix Had2 obtained by inverting the positive and negative polarities of the Hadamard matrix Had1.

Specifically, the drive electrode Tx at the Tx coordinate C is supplied with the negative (−1) potential in the phases P5, P6, P7, and P8. The drive electrode Tx at the Tx coordinate E is supplied with the negative (−1) potential in the phases P5 and P7 and with the positive (1) potential in the phases P6 and P8. The drive electrode Tx at the Tx coordinate G is supplied with the negative (−1) potential in the phases P5 and P6 and with the positive (1) potential in the phases P7 and P8. The drive electrode Tx at the Tx coordinate A is supplied with the negative (−1) potential in the phases P5 and P8 and with the positive (1) potential in the phases P6 and P7.

As illustrated in FIG. 7 and comparison between FIGS. 10 and 11, the positive and negative polarities of the electric potential of the drive signals supplied to the drive electrode at the Tx coordinate B are opposite to those of the electric potential of the drive signals supplied to the drive electrode at the Tx coordinate C in each of phases P5 to P8. The positive and negative polarities of the electric potential of the drive signals supplied to the drive electrode at the Tx coordinate D are opposite to those of the electric potential of the drive signals supplied to the drive electrode at the Tx coordinate E in each of phases P5 to P8. The positive and negative polarities of the electric potential of the drive signals supplied to the drive electrode at the Tx coordinate F are opposite to those of the electric potential of the drive signals supplied to the drive electrode at the Tx coordinate G in each of phases P5 to P8. As described above, there are combinations of two drive electrodes Tx adjacent to each other and having opposite positive and negative polarities of the electric potential of the drive signals supplied thereto in each phase.

Let us compare the positive and negative polarities of the electric potential supplied to the drive electrodes Tx in the first drive period with the positive and negative polarities of the electric potential supplied to the drive electrodes Tx in the second drive period. As illustrated in FIG. 7 and comparison between FIGS. 8 and 10, the electric potential supplied to the drive electrode Tx at the Tx coordinate A in the phases P1 to P4 is the same as the electric potential supplied to the drive electrode Tx at the Tx coordinate B in the phases P5 to P8 in that they are maintained at the positive (1) potential. The transition pattern of the positive and negative polarities of the electric potential supplied to the drive electrode Tx at the Tx coordinate C in the phases P1 to P4 is the same as the transition pattern of the positive and negative polarities of the electric potential supplied to the drive electrode Tx at the Tx coordinate D in the phases P5 to P8. The transition pattern of the positive and negative polarities of the electric potential supplied to the drive electrode Tx at the Tx coordinate E in the phases P1 to P4 is the same as the transition pattern of the positive and negative polarities of the electric potential supplied to the drive electrode Tx at the Tx coordinate F in the phases P5 to P8. The transition pattern of the positive and negative polarities of the electric potential supplied to the drive electrode Tx at the Tx coordinate G in the phases P1 to P4 is the same as the transition pattern of the positive and negative polarities of the electric potential supplied to the drive electrode Tx at the Tx coordinate H in the phases P5 to P8.

As illustrated in FIG. 7 and comparison between FIGS. 9 and 11, the electric potential supplied to the drive electrode Tx at the Tx coordinate B in the phases P1 to P4 is the same as the electric potential supplied to the drive electrode Tx at the Tx coordinate C in the phases P5 to P8 in that they are maintained at the negative (−1) potential. The transition pattern of the positive and negative polarities of the electric potential supplied to the drive electrode Tx at the Tx coordinate D in the phases P1 to P4 is the same as the transition pattern of the positive and negative polarities of the electric potential supplied to the drive electrode Tx at the Tx coordinate E in the phases P5 to P8. The transition pattern of the positive and negative polarities of the electric potential supplied to the drive electrode Tx at the Tx coordinate F in the phases P1 to P4 is the same as the transition pattern of the positive and negative polarities of the electric potential supplied to the drive electrode Tx at the Tx coordinate G in the phases P5 to P8.

In other words, the transition patterns of the positive and negative polarities of the electric potential supplied to the drive electrodes Tx in the first drive period are applied to the second drive period by shifting the Tx coordinates by one. The direction of shifting the Tx coordinates is from one end (Tx coordinate A) of the array of the drive electrodes Tx to the other end (Tx coordinate H).

Thus, the Hadamard matrix Had1 in the first drive period described with reference to FIG. 8 and the Hadamard matrix Had1 in the second drive period described with reference to FIG. 10 are the same, except that the Tx coordinates are shifted by one in the array direction of the drive electrodes Tx. The Hadamard matrix Had2 in the first drive period described with reference to FIG. 9 and the Hadamard matrix Had2 in the second drive period described with reference to FIG. 11 are the same, except that the Tx coordinates are shifted by one in the array direction of the drive electrodes Tx.

Due to the shift in the combinations of the electric potential of the drive signals and the Tx coordinates between the first drive period and the second drive period, the transition pattern of the positive and negative polarities of the electric potential supplied to the drive electrode Tx at the Tx coordinate H in the phases P1 to P4 corresponds to the transition pattern of the positive and negative polarities of the electric potential supplied to the drive electrode Tx at the Tx coordinate A in the phases P5 to P8. As illustrated in FIG. 7 and comparison between FIGS. 10 and 11, the positive and negative polarities of the electric potential of the drive signals supplied to the drive electrode at the Tx coordinate H are opposite to those of the electric potential of the drive signals supplied to the drive electrode at the Tx coordinate A in each of phases P5 to P8. This is because, due to the shift in the combinations, the combinations of the drive electrodes Tx having opposite positive and negative polarities of the electric potential of the drive signals in the second drive period include the combination of the drive electrode Tx at the Tx coordinate B and the drive electrode Tx at the Tx coordinate C, the combination of the drive electrode Tx at the Tx coordinate D and the drive electrode Tx at the Tx coordinate E, and the combination of the drive electrode Tx at the Tx coordinate F and the drive electrode Tx at the Tx coordinate G. As a result, the drive electrodes Tx at both ends in the array direction of the drive electrodes Tx each fail to be combined with the adjacent drive electrode Tx.

The following describes, with reference to FIGS. 12 to 27, the touch detection signals obtained by supplying the drive signals described with reference to FIGS. 7 to 11. Before the explanation, a reference example is described with reference to FIG. 12.

FIG. 12 is a diagram of the relation between signal strength, Tx coordinate, and Rx coordinate obtained in the reference example. Unlike the embodiment, the reference example does not perform bundle drive for all the drive electrodes Tx and supplies the drive signal with the positive (1) potential to each of the drive electrodes Tx at different timings. The reference example obtains the touch detection signals from the detection electrodes Rx at each timing when the drive signal is supplied to each of the drive electrodes Tx. The numerical values of the coordinates A1, A2, . . . , and H8 in FIG. 12 indicate the signal strength of the touch detection signals.

In the example illustrated in FIG. 12, a signal having a signal strength of "10" is obtained at the coordinates C2, C4, C6, D2, E2, F2 and F4. A signal having a signal strength of "9" is obtained at the coordinates D6. A signal having a signal strength of "8" is obtained at the coordinates E6. A signal having a signal strength of "7" is obtained at the coordinates F6. A signal having a signal strength of "5" is obtained at the other coordinates. The other coordinates include the coordinates A1, A2, A3, A4, A5, A6, A7, and A8, the coordinates B1, B2, B3, B4, B5, B6, B7, and B8, the coordinates C1, C3, C5, C7, and C8, the coordinates D1, D3, D5, D7, and D8, the coordinates E1, E3, E5, E7, and E8, the coordinates F1, F3, F5, F7, and F8, the coordinates G1, G2, G3, G4, G5, G6, G7, and G8, and the coordinates H1, H2, H3, H4, H5, H6, H7, and H8.

The values of the signal strength illustrated in FIG. 12 correspond to the capacitance Cap generated at the coordinates A1, A2, . . . , and H8 in the reference example. In other words, the values of the signal strength illustrated in FIG. 12 reflect the state of the detection region SA in the reference example. The following describes, with reference to FIGS. 13 to 27, deriving the touch detection signals obtained by implementing the embodiment in the same state of the detection region SA as that of the detection region SA where the touch detection signals illustrated in FIG. 12 are obtained in the reference example.

FIG. 13 is a diagram of outputs from the detection electrodes Rx and the signal strengths at the coordinates included in the outputs from the detection electrodes Rx obtained in the phase P1. As described with reference to FIG. 7, the drive electrodes Tx at the Tx coordinates A, C, E, and G are supplied with the positive (1) potential, and the drive electrodes Tx at the Tx coordinates B, D, F, and H are supplied with the negative (-1) potential in the phase P1.

In other words, the positive and negative polarities of the drive signals supplied to the drive electrodes Tx at the Tx coordinates A, C, E, and G in the phase P1 according to the first embodiment are the same as the polarities of the drive signals supplied to the drive electrodes Tx at the Tx coordinates A, C, E, and G in the reference example. Consequently, the signal strengths at the coordinates corresponding to the Tx coordinates A, C, E, and G (coordinates A1, A2, . . . , A8, C1, C2, . . . , C8, E1, E2, . . . , E8, G1, G2, . . . , and G8) out of the signal strengths generated at the coordinates A1, A2, . . . , and H8 in the phase P1 are the same as the signal strengths in the reference example.

By contrast, the positive and negative polarities of the drive signals supplied to the drive electrodes Tx at the Tx coordinates B, D, F, and H in the phase P1 according to the first embodiment are opposite to those of the drive signals supplied to the drive electrodes Tx at the Tx coordinates B, D, F, and H in the reference example. As a result, the positive and negative polarities of the capacitance Cap are reversed at the coordinates corresponding to the Tx coordinates B, D, F, and H (coordinates B1, B2, . . . , B8, D1, D2, . . . , D8, F1, F2, . . . , F8, H1, H2, . . . , and H8) in the phase P1. In other words, the height relation of the electric potential between the drive electrode Tx and the detection electrode Rx is reversed at the coordinates corresponding to the Tx coordinates B, D, F, and H with respect to the reference example. As a result, the positive and negative polarities of the capacitance Cap at the coordinates are reversed.

Unlike the reference example that supplies the drive signal to each of the drive electrodes Tx at different timings, the embodiment supplies the drive signals to all the drive electrodes Tx at the same timing in each phase. Consequently, each detection electrode Rx generates an output corresponding to the sum of the capacitance Cap generated between the detection electrode Rx and the drive electrodes Tx intersecting the detection electrode Rx in planar view when all the drive electrodes Tx are driven. In other words, the output from the detection electrode Rx in each phase indicates a signal strength obtained by adding up the signal strengths at a plurality of coordinates having the common Rx coordinate out of the coordinates (e.g., A1, A2, . . . , and H8) in the detection region SA.

In one detection electrode Rx, signals the signal strengths of which are the same and the positive and negative polarities of the capacitance Cap of which are opposite act to cancel each other out. Considering this mechanism, the signal strength obtained when the capacitance Cap is reversed is represented as a negative value of the signal strength (positive value) before the reversal. Consequently, the signal strengths at the coordinates corresponding to the Tx coordinates B, D, F, and H out of the signal strengths generated at the coordinates A1, A2, . . . , and H8 in the phase P1 are strengths obtained by reversing the positive and negative polarities of the signal strengths at these coordinates in the reference example.

As a result, the output Op1 in the phase P1 indicates a signal strength of "0" obtained by adding up signal strengths of "5" at the coordinates A1, C1, E1, and G1 and signal strengths of "-5" at the coordinates B1, D1, F1, and H1 illustrated in FIG. 13. In other words, Op1=A1+B1+C1+D1+E1+F1+G1+H1=5+(-5)+5+(-5)+5+(-5)+5+(-5)=0 is derived. Similarly, the outputs Op2, Op3, Op4, Op5, Op7, and Op8 in the phase P1 indicate a signal strength of "0" The output Op6 in the phase P1 indicates a signal strength of "2".

FIG. 14 is a diagram of outputs from the detection electrodes Rx and the signal strengths at the coordinates included in the outputs from the detection electrodes Rx obtained in the phase P2. As described with reference to FIG. 7, the drive electrodes Tx at the Tx coordinates A, D, E, and H are supplied with the positive (1) potential, and the drive electrodes Tx at the Tx coordinates B, C, F, and G are supplied with the negative (-1) potential in the phase P2.

In other words, the positive and negative polarities of the drive signals supplied to the drive electrodes Tx at the Tx coordinates A, D, E, and H in the phase P2 are the same as the polarities in the reference example. Consequently, the signal strengths at the coordinates corresponding to the Tx coordinates A, D, E, and H (coordinates A1, A2, . . . , A8, D1, D2, . . . , D8, E1, E2, . . . , E8, H1, H2, . . . , and H8) out of the signal strengths generated at the coordinates A1, A2, . . . , and H8 in the phase P2 are the same as the signal strengths in the reference example.

By contrast, the positive and negative polarities of the drive signals supplied to the drive electrodes Tx at the Tx coordinates B, C, F, and G in the phase P2 are opposite to those in the reference example. Consequently, the signal strengths at the coordinates corresponding to the Tx coordinates B, C, F, and G (coordinates B1, B2, . . . , B8, C1, C2, . . . , C8, F1, F2, . . . , F8, G1, G2, . . . , and G8) out of the signal strengths generated at the coordinates A1, A2, . . . , and H8 in the phase P2 are strengths obtained by reversing the positive and negative polarities of the signal strengths at these coordinates in the reference example.

As a result, the output Op1 in the phase P2 indicates a signal strength of "0" obtained by adding up signal strengths of "5" at the coordinates A1, D1, E1, and H1 and signal strengths of "−5" at the coordinates B1, C1, F1, and G1 illustrated in FIG. 14. In other words, Op1=A1+B1+C1+D1+E1+F1+G1+H1=5+(−5)+(−5)+5+5+(−5)+(−5)+5=0 is derived. Similarly, the outputs Op2, Op3, Op5, Op6, Op7, and Op8 in the phase P2 indicate a signal strength of "0". The output Op4 in the phase P2 indicates a signal strength of "−10".

FIG. 15 is a diagram of outputs from the detection electrodes Rx and the signal strengths at the coordinates included in the outputs from the detection electrodes Rx obtained in the phase P3. As described with reference to FIG. 7, the drive electrodes Tx at the Tx coordinates A, C, F, and H are supplied with the positive (1) potential, and the drive electrodes Tx at the Tx coordinates B, D, E, and G are supplied with the negative (−1) potential in the phase P3.

In other words, the positive and negative polarities of the drive signals supplied to the drive electrodes Tx at the Tx coordinates A, C, F, and H in the phase P3 are the same as the polarities in the reference example.

Consequently, the signal strengths at the coordinates corresponding to the Tx coordinates A, C, F, and H (coordinates A1, A2, ..., A8, C1, C2, ..., C8, F1, F2, ..., F8, H1, H2, ..., and H8) out of the signal strengths generated at the coordinates A1, A2, ..., and H8 in the phase P3 are the same as the signal strengths in the reference example.

By contrast, the positive and negative polarities of the drive signals supplied to the drive electrodes Tx at the Tx coordinates B, D, E, and G in the phase P3 are opposite to those in the reference example. Consequently, the signal strengths at the coordinates corresponding to the Tx coordinates B, D, E, and G (coordinates B1, B2, ..., B8, D1, D2, ..., D8, E1, E2, ..., E8, G1, G2, ..., and G8) out of the signal strengths generated at the coordinates A1, A2, ..., and H8 in the phase P3 are strengths obtained by reversing the positive and negative polarities of the signal strengths at these coordinates in the reference example.

As a result, the output Op1 in the phase P3 indicates a signal strength of "0" obtained by adding up signal strengths of "5" at the coordinates A1, C1, F1, and H1 and signal strengths of "−5" at the coordinates B1, D1, E1, and G1 illustrated in FIG. 15. In other words, Op1=A1+B1+C1+D1+E1+F1+G1+H1=5+(−5)+5+(−5)+(−5)+5+(−5)+5=0 is derived. Similarly, the outputs Op2, Op3, Op5, Op6, Op7, and Op8 in the phase P3 indicate a signal strength of "0" The output Op4 in the phase P3 indicates a signal strength of "10".

FIG. 16 is a diagram of outputs from the detection electrodes Rx and the signal strengths at the coordinates included in the outputs from the detection electrodes Rx obtained in the phase P4. As described with reference to FIG. 7, the drive electrodes Tx at the Tx coordinates A, D, F, and G are supplied with the positive (1) potential, and the drive electrodes Tx at the Tx coordinates B, C, E, and H are supplied with the negative (−1) potential in the phase P4.

In other words, the positive and negative polarities of the drive signals supplied to the drive electrodes Tx at the Tx coordinates A, D, F, and G in the phase P4 are the same as the polarities in the reference example. Consequently, the signal strengths at the coordinates corresponding to the Tx coordinates A, D, F, and G (coordinates A1, A2, ..., A8, D1, D2, ..., D8, F1, F2, ..., F8, G1, G2, ..., and G8) out of the signal strengths generated at the coordinates A1, A2, ..., and H8 in the phase P4 are the same as the signal strengths in the reference example.

By contrast, the positive and negative polarities of the drive signals supplied to the drive electrodes Tx at the Tx coordinates B, C, E, and H in the phase P4 are opposite to those in the reference example. Consequently, the signal strengths at the coordinates corresponding to the Tx coordinates B, C, E, and H (coordinates B1, B2, ..., B8, C1, C2, ..., C8, E1, E2, ..., E8, H1, H2, ..., and H8) out of the signal strengths generated at the coordinates A1, A2, ..., and H8 in the phase P4 are strengths obtained by reversing the positive and negative polarities of the signal strengths at these coordinates in the reference example.

As a result, the output Op1 in the phase P4 indicates a signal strength of "0" obtained by adding up signal strengths of "5" at the coordinates A1, D1, F1, and G1 and signal strengths of "−5" at the coordinates B1, C1, E1, and H1 illustrated in FIG. 16. In other words, Op1=A1+B1+C1+D1+E1+F1+G1+H1=5+(−5)+(−5)+5+(−5)+5+5+(−5)=0 is derived. Similarly, the outputs Op2, Op3, Op4, Op5, Op7, and Op8 in the phase P4 indicate a signal strength of "0" The output Op6 in the phase P4 indicates a signal strength of "−2".

FIG. 17 is a diagram of outputs from the detection electrodes Rx and the signal strengths at the coordinates included in the outputs from the detection electrodes Rx obtained in the phase P5. As described with reference to FIG. 7, the drive electrodes Tx at the Tx coordinates B, D, F, and H are supplied with the positive (1) potential, and the drive electrodes Tx at the Tx coordinates A, C, E, and G are supplied with the negative (−1) potential in the phase P5.

In other words, the positive and negative polarities of the drive signals supplied to the drive electrodes Tx at the Tx coordinates B, D, F, and H in the phase P5 are the same as the polarities in the reference example.

Consequently, the signal strengths at the coordinates corresponding to the Tx coordinates B, D, F, and H (coordinates B1, B2, ..., B8, D1, D2, ..., D8, F1, F2, ..., F8, H1, H2, ..., and H8) out of the signal strengths generated at the coordinates A1, A2, ..., and H8 in the phase P5 are the same as the signal strengths in the reference example.

By contrast, the positive and negative polarities of the drive signals supplied to the drive electrodes Tx at the Tx coordinates A, C, E, and G in the phase P5 are opposite to those in the reference example. Consequently, the signal strengths at the coordinates corresponding to the Tx coordinates A, C, E, and G (coordinates A1, A2, ..., A8, C1, C2, ..., C8, E1, E2, ..., E8, G1, G2, ..., and G8) out of the signal strengths generated at the coordinates A1, A2, ..., and H8 in the phase P5 are strengths obtained by reversing the positive and negative polarities of the signal strengths at these coordinates in the reference example.

As a result, the output Op1 in the phase P5 indicates a signal strength of "0" obtained by adding up signal strengths of "5" at the coordinates B1, D1, F1, and H1 and signal strengths of "−5" at the coordinates A1, C1, E1, and G1 illustrated in FIG. 17. In other words, Op1=A1+B1+C1+D1+E1+F1+G1+H1=(−5)+5+(−5)+5+(−5)+5+(−5)+5=0 is derived. Similarly, the outputs Op2, Op3, Op4, Op5, Op7, and Op8 in the phase P5 indicate a signal strength of "0". The output Op6 in the phase P5 indicates a signal strength of "−2".

FIG. 18 is a diagram of outputs from the detection electrodes Rx and the signal strengths at the coordinates included in the outputs from the detection electrodes Rx obtained in the phase P6. As described with reference to FIG. 7, the drive electrodes Tx at the Tx coordinates A, B, E, and F are supplied with the positive (1) potential, and the drive electrodes Tx at the Tx coordinates C, D, G, and H are supplied with the negative (−1) potential in the phase P6.

In other words, the positive and negative polarities of the drive signals supplied to the drive electrodes Tx at the Tx coordinates A, B, E, and F in the phase P6 are the same as the polarities in the reference example. Consequently, the signal strengths at the coordinates corresponding to the Tx coordinates A, B, E, and F (coordinates A1, A2, . . . , A8, B1, B2, . . . , B8, E1, E2, . . . , E8, F1, F2, . . . , and F8) out of the signal strengths generated at the coordinates A1, A2, . . . , and H8 in the phase P6 are the same as the signal strengths in the reference example.

By contrast, the positive and negative polarities of the drive signals supplied to the drive electrodes Tx at the Tx coordinates C, D, G, and H in the phase P6 are opposite to those in the reference example. Consequently, the signal strengths at the coordinates corresponding to the Tx coordinates C, D, G, and H (coordinates C1, C2, . . . , C8, D1, D2, . . . , D8, G1, G2, . . . , G8, H1, H2, . . . , and H8) out of the signal strengths generated at the coordinates A1, A2, . . . , and H8 in the phase P6 are strengths obtained by reversing the positive and negative polarities of the signal strengths at these coordinates in the reference example.

As a result, the output Op1 in the phase P6 indicates a signal strength of "0" obtained by adding up signal strengths of "5" at the coordinates A1, B1, E1, and F1 and signal strengths of "−5" at the coordinates C1, D1, G1, and H1 illustrated in FIG. 18. In other words, Op1=A1+B1+C1+D1+E1+F1+G1+H1=5+5+(−5)+(−5)+5+5+(−5)+(−5)=0 is derived. Similarly, the outputs Op2, Op3, Op4, Op5, Op7, and Op8 in the phase P6 indicate a signal strength of "0". The output Op6 in the phase P2 indicates a signal strength of "−4".

FIG. 19 is a diagram of outputs from the detection electrodes Rx and the signal strengths at the coordinates included in the outputs from the detection electrodes Rx obtained in the phase P7. As described with reference to FIG. 7, the drive electrodes Tx at the Tx coordinates A, B, D, and G are supplied with the positive (1) potential, and the drive electrodes Tx at the Tx coordinates C, E, F, and H are supplied with the negative (−1) potential in the phase P7.

In other words, the positive and negative polarities of the drive signals supplied to the drive electrodes Tx at the Tx coordinates A, B, D, and G in the phase P7 are the same as the polarities in the reference example.

Consequently, the signal strengths at the coordinates corresponding to the Tx coordinates A, B, D, and G (coordinates A1, A2, . . . , A8, B1, B2, . . . , B8, D1, D2, . . . , D8, G1, G2, . . . , and G8) out of the signal strengths generated at the coordinates A1, A2, . . . , and H8 in the phase P7 are the same as the signal strengths in the reference example.

By contrast, the positive and negative polarities of the drive signals supplied to the drive electrodes Tx at the Tx coordinates C, E, F, and H in the phase P7 are opposite to those in the reference example. Consequently, the signal strengths at the coordinates corresponding to the Tx coordinates C, E, F, and H (coordinates C1, C2, . . . , C8, E1, E2, . . . , E8, F1, F2, . . . , F8, H1, H2, . . . , and H8) out of the signal strengths generated at the coordinates A1, A2, . . . , and H8 in the phase P7 are strengths obtained by reversing the positive and negative polarities of the signal strengths at these coordinates in the reference example.

As a result, the output Op1 in the phase P7 indicates a signal strength of "0" obtained by adding up signal strengths of "5" at the coordinates A1, B1, D1, and G1 and signal strengths of "−5" at the coordinates C1, E1, F1, and H1 illustrated in FIG. 19. In other words, Op1=A1+B1+C1+D1+E1+F1+G1+H1=5+5+(−5)+5+(−5)+(−5)+5+(−5)=0 is derived. Similarly, the outputs Op3, Op5, Op7, and Op8 in the phase P7 indicate a signal strength of "0". The outputs Op2 and Op4 in the phase P7 indicate a signal strength of "−10". The output Op6 in the phase P7 indicates a signal strength of "−6".

FIG. 20 is a diagram of outputs from the detection electrodes Rx and the signal strengths at the coordinates included in the outputs from the detection electrodes Rx obtained in the phase P8. As described with reference to FIG. 7, the drive electrodes Tx at the Tx coordinates B, E, G, and H are supplied with the positive (1) potential, and the drive electrodes Tx at the Tx coordinates A, C, D, and F are supplied with the negative (−1) potential in the phase P8.

In other words, the positive and negative polarities of the drive signals supplied to the drive electrodes Tx at the Tx coordinates B, E, G, and H in the phase P8 are the same as the polarities in the reference example. Consequently, the signal strengths at the coordinates corresponding to the Tx coordinates B, E, G, and H (coordinates B1, B2, . . . , B8, E1, E2, . . . , E8, G1, G2, . . . , G8, H1, H2, . . . , and H8) out of the signal strengths generated at the coordinates A1, A2, . . . , and H8 in the phase P8 are the same as the signal strengths in the reference example.

By contrast, the positive and negative polarities of the drive signals supplied to the drive electrodes Tx at the Tx coordinates A, C, D, and F in the phase P8 are opposite to those in the reference example. Consequently, the signal strengths at the coordinates corresponding to the Tx coordinates B, C, F, and G (coordinates A1, A2, . . . , A8, C1, C2, . . . , C8, D1, D2, . . . , D8, F1, F2, . . . , and F8) out of the signal strengths generated at the coordinates A1, A2, . . . , and H8 in the phase P8 are strengths obtained by reversing the positive and negative polarities of the signal strengths at these coordinates in the reference example.

As a result, the output Op1 in the phase P8 indicates a signal strength of "0" obtained by adding up signal strengths of "5" at the coordinates B1, E1, G1, and H1 and signal strengths of "−5" at the coordinates A1, C1, D1, and F1 illustrated in FIG. 20. In other words, Op1=A1+B1+C1+D1+E1+F1+G1+H1=(−5)+5+(−5)+(−5)+5+(−5)+5+5=0 is derived. Similarly, the outputs Op3, Op5, Op7, and Op8 in the phase P8 indicate a signal strength of "0". The outputs Op2 and Op4 in the phase P7 indicate a signal strength of "−10". The output Op6 in the phase P7 indicates a signal strength of "−8".

FIG. 21 is a diagram of a matrix MaA indicating the outputs from the detection electrodes Rx in the first drive period. FIG. 22 is a diagram of a matrix MaB indicating the outputs from the detection electrodes Rx in the second drive period. The elements in the row direction of the matrices MaA and MaB are the outputs from the detection electrodes Rx arranged in the order of the Rx coordinate (outputs Op1, Op2, Op3, Op4, Op5, Op6, Op7, and Op8). The elements in the column direction of the matrix MaA are the phases P1 to P4 arranged in the order of execution (phases P1, P2, P3, and P4). The elements in the column direction of the matrix MaB are the phases P5 to P8 arranged in the order of execution (phases P5, P6, P7, and P8). As illustrated in FIG. 21, the outputs from the detection electrodes Rx in the first drive period can be treated as the matrix MaA. As illustrated in FIG. 22, the outputs from the detection electrodes Rx in the second drive period can be treated as the matrix MaB.

The detection circuit 20 obtains the outputs from the detection electrodes Rx indicating the signal strengths described above in each phase. The signal amplifier 31 amplifies the outputs from the detection electrodes Rx output from the detection circuit 20 individually in each phase. The A/D converter 32 performs A/D conversion on the outputs from the detection electrodes Rx amplified by the signal amplifier 31 individually in each phase. The signal processor 33 obtains the outputs from the detection electrodes Rx resulting from the A/D conversion.

The matrix MaA illustrated in FIG. 21 can be considered as a matrix obtained by encoding the signal strengths corresponding to the capacitance Cap between the drive electrodes Tx and the detection electrodes Rx illustrated in FIG. 12 with the Hadamard matrix Had1 illustrated in FIG. 8 and the Hadamard matrix Had2 illustrated in FIG. 9. The matrix MaB illustrated in FIG. 22 can be considered as a matrix obtained by encoding the signal strengths corresponding to the capacitance Cap between the drive electrodes Tx and the detection electrodes Rx illustrated in FIG. 12 with the Hadamard matrix Had1 illustrated in FIG. 10 and the Hadamard matrix Had2 illustrated in FIG. 11.

FIG. 23 is a diagram of a first matrix Ma1 including the signal strengths of first composite coordinates in the detection region SA derived based on the matrix MaA illustrated in FIG. 21. The signal processor 33 decodes the matrix MaA. Specifically, to decode the matrix MaA, the signal processor 33 performs arithmetic processing (difference processing) of calculating the product of the matrix MaA and the Hadamard matrix Had1 and dividing the product by the number of column elements. The number of column elements in the matrix MaA illustrated in FIG. 21 is four. Consequently, the signal processor 33 calculates (MaA×Had)/4, thereby deriving the first matrix Ma1. The first matrix Ma1 is the result of decoding the matrix MaA.

As illustrated in FIG. 23, the first matrix Ma1 can be considered as a matrix indicating the signal strengths at the coordinates in a coordinate system having the Rx coordinates as the row elements and the first composite coordinates of the Tx coordinates as the column elements. The first composite coordinates of the Tx coordinates include composite coordinates the number of which is half (e.g., 4) of the number of Tx coordinates (e.g., 8). Each composite coordinate included in the first composite coordinates is represented by a combination of two Tx coordinates corresponding to a combination of two drive electrodes Tx adjacent to each other and having opposite polarities of the drive signals supplied in each phase in the first drive period.

As illustrated in comparison between FIGS. 8 and 9, the combinations of the drive electrodes Tx adjacent to each other and having opposite positive and negative polarities of the drive signals supplied in the phases P1, P2, P3, and P4 are the following four combinations: the combination of the drive electrode Tx at the Tx coordinate A and the drive electrode Tx at the Tx coordinate B, the combination of the drive electrode Tx at the Tx coordinate C and the drive electrode Tx at the Tx coordinate D, the combination of the drive electrode Tx at the Tx coordinate E and the drive electrode Tx at the Tx coordinate F, and the combination of the drive electrode Tx at the Tx coordinate G and the drive electrode Tx at the Tx coordinate H. Consequently, the first composite coordinates of the Tx coordinates illustrated in FIG. 23 are the following four coordinates: a Tx coordinate (A-B) obtained by combining the Tx coordinate A and the Tx coordinate B into one coordinate, a Tx coordinate (C-D) obtained by combining the Tx coordinate C and the Tx coordinate D into one coordinate, a Tx coordinate (E-F) obtained by combining the Tx coordinate E and the Tx coordinate F into one coordinate, and a Tx coordinate (G-H) obtained by combining the Tx coordinate G and the Tx coordinate H into one coordinate.

The signal processor 33 treats the first matrix Ma1 as a matrix having the Rx coordinates as the row elements and the first composite coordinates of the Tx coordinates as the column elements and indicating the signal strengths at the first composite coordinates in the detection region SA as illustrated in FIG. 23. The signal processor 33 treats the signal strengths indicated by the first matrix Ma1 as the touch detection signals at the respective first composite coordinates.

In the following description, to indicate certain coordinates in the detection region SA using the first composite coordinate of the Tx coordinates, the first composite coordinate of the Tx coordinates is written in parentheses ( ), and the numerical value indicating the Rx coordinate is written behind the parentheses. For example, coordinates (A-B)1 indicate the coordinates corresponding to the combination of the Tx coordinate (A-B) and the Rx coordinate 1.

In FIG. 23, decoding results are derived having a signal strength of 5 at the coordinates (C-D)4, a signal strength of 1 at the coordinates (C-D)6 and (E-F)6, a signal strength of −5 at the coordinates (E-F)4, and a signal strength of 0 at the other coordinates. The other coordinates are the coordinates (A-B)1, (A-B)2, . . . , (A-B)8, (C-D)1, (C-D)2, (C-D)3, (C-D)5, (C-D)7, (C-D)8, (E-F)1, (E-F)2, (E-F)3, (E-F)5, (E-F)7, (E-F)8, (G-H)1, (G-H)2, . . . , and (G-H)8.

FIG. 24 is a diagram of a second matrix Ma2 including the signal strengths of second composite coordinates in the detection region SA derived based on the matrix MaB illustrated in FIG. 22. The signal processor 33 decodes the matrix MaB. Specifically, to decode the matrix MaB, the signal processor 33 performs arithmetic processing of calculating the product of the matrix MaB and the Hadamard matrix Had1 and dividing the product by the number of column elements. The number of column elements in the matrix MaB illustrated in FIG. 22 is four. Consequently, the signal processor 33 calculates (MaB×Had)/4, thereby deriving the second matrix Ma2. The second matrix Ma2 is the result of decoding the matrix MaB.

As illustrated in FIG. 24, the second matrix Ma2 can be considered as a matrix indicating the signal strengths at the coordinates in a coordinate system having the Rx coordinates as the row elements and the second composite coordinates of the Tx coordinates as the column elements. Similarly to the first composite coordinates, the second composite coordinates of the Tx coordinates include composite coordinates the number of which is half (e.g., 4) of the number of Tx coordinates (e.g., 8). Each composite coordinate included in the second composite coordinates is represented by a combination of two Tx coordinates corresponding to a combination of two drive electrodes Tx adjacent to each other or positioned at both ends in the array direction of the drive electrodes Tx and having opposite positive and negative polarities of the drive signals supplied in each phase in the second drive period.

As illustrated in comparison between FIGS. 8 and 9, the combinations of the drive electrodes Tx adjacent to each other or positioned at both ends in the first direction Dx and having opposite positive and negative polarities of the drive signals supplied in the phases P1, P2, P3, and P4 are the following four combinations: the combination of the drive electrode Tx at the Tx coordinate B and the drive electrode Tx at the Tx coordinate C, the combination of the drive electrode Tx at the Tx coordinate D and the drive electrode Tx at the Tx coordinate E, the combination of the drive electrode Tx at the Tx coordinate F and the drive electrode Tx at the Tx coordinate G, and the combination of the drive electrode Tx at the Tx coordinate H and the drive electrode Tx at the Tx coordinate A. Consequently, the second composite coordinates of the Tx coordinates illustrated in FIG. 24 are the following four coordinates: a Tx coordinate (B-C) obtained by combining the Tx coordinate B and the Tx coordinate C into one coordinate, a Tx coordinate (D-E) obtained by combining the Tx coordinate D and the Tx coordinate E into one coordinate, a Tx coordinate (F-G) obtained by combining the Tx coordinate F and the Tx coordinate G into one coordinate, and a Tx coordinate (H-A) obtained by combining the Tx coordinate H and the Tx coordinate A into one coordinate.

The signal processor 33 treats the second matrix Ma2 as a matrix having the Rx coordinates as the row elements and the second composite coordinates of the Tx coordinates as the column elements and indicating the signal strengths at the second composite coordinates in the detection region SA as illustrated in FIG. 24. The signal processor 33 treats the signal strengths indicated by the second matrix Ma2 as the touch detection signals at the respective second composite coordinates.

In the following description, to indicate certain coordinates in the detection region SA using the second composite coordinate of the Tx coordinates, the second composite coordinate of the Tx coordinates is written in parentheses ( ), and the numerical value indicating the Rx coordinate is written behind the parentheses. For example, coordinates (B-C)1 indicate the coordinates corresponding to the combination of the Tx coordinate (B-C) and the Rx coordinate 1.

In FIG. 22, decoding results having a signal strength of 5 at the coordinates (F-G)2 and (F-G)4 are derived. The decoding results having a signal strength of 2 at the coordinates (F-G)6 are derived. The decoding results having a signal strength of 1 at the coordinates (D-E)6 are derived. The decoding results having a signal strength of −5 at the coordinates (B-C)2, (B-C)4, and (B-C)6 are derived. The decoding results having a signal strength of 0 at the other coordinates are derived. The other coordinates are the coordinates (B-C)1, (B-C)3, (B-C)5, (B-C)7, (B-C)8, (D-E)1, (D-E)2, (D-E)3, (D-E)4, (D-E)5, (D-E) 7, (D-E) 8, (F-G) 1, (F-G)3, (F-G)5, (F-G) 7, (F-G) 8, (H-A)1, (H-A)2, . . . , and (H-A)8.

FIG. 25 is a diagram of the decoding results in the detection region SA calculated based on FIGS. 23 and 24. The signal processor 33 combines the first matrix Ma1 (refer to FIG. 23) and the second matrix Ma2 (refer to FIG. 24) to derive the decoding results in the detection region SA. Specifically, the signal processor 33 derives a matrix Ma3 by rearranging the decoding results at the respective first composite coordinates described with reference to FIG. 21 and the decoding results at the respective second composite coordinates described with reference to FIG. 22 in the column direction according to the order of the Tx coordinates.

More specifically, the signal processor 33 inserts the column of the coordinate (B-C) between the column of the coordinate (A-B) and the column of the coordinate (C-D) as illustrated in the matrix Ma3 in FIG. 25. The column of the coordinate (A-B) and the column of the coordinate (C-D) are included in the first matrix Ma1 (refer to FIG. 23). The column of the coordinate (B-C) is included in the second matrix Ma2 (refer to FIG. 24).

The signal processor 33 inserts the column of the coordinate (D-E) between the column of the coordinate (C-D) and the column of the coordinate (E-F) as illustrated in the matrix Ma3 in FIG. 25. The column of the coordinate (C-D) and the column of the coordinate (E-F) are included in the first matrix Ma1 (refer to FIG. 23). The column of the coordinate (D-E) is included in the second matrix Ma2 (refer to FIG. 24).

The signal processor 33 inserts the column of the coordinate (F-G) between the column of the coordinate (E-F) and the column of the coordinate (G-H) as illustrated in the matrix Ma3 in FIG. 25. The column of the coordinate (E-F) and the column of the coordinate (G-H) are included in the first matrix Ma1 (refer to FIG. 23). The column of coordinate (F-G) is included in the second matrix Ma2 (refer to FIG. 24).

The column of the coordinate (H-A) out of the columns in the second matrix Ma2 (refer to FIG. 22) is not included in the third matrix Ma3. In FIG. 25, the column of coordinate (H-A) is arranged on the opposite side of the column of the coordinate (B-C) with the column of the coordinate (A-B) interposed therebetween. This arrangement, however, is not required in the processing for deriving the touch detection results and can be omitted. The arrangement will be described later in detail.

In the following description, the columns and the column of the coordinate (H-A) included in the third matrix Ma3 illustrated in FIG. 25 are assigned symbols of Greek letters. Specifically, as illustrated in FIG. 25, a column $\alpha$ refers to the column of the coordinate (G-H). A column $\beta$ refers to the column of the coordinate (F-G). A column $\Gamma$ refers to the column of the coordinate (E-F). A column $\Delta$ refers to the column of the coordinate (D-E). A column $\eta$ refers to the column of the coordinate (C-D). A column $\theta$ refers to the column of the coordinate (B-C). A column $\kappa$ refers to the column of the coordinate (A-B). A column $\lambda$ refers to the column of the coordinate (H-A). To indicate certain coordinates in the detection region SA using the symbols of the Greek letters, the coordinates are represented by combining the Greek letter corresponding to the position of the column (Tx coordinate) and the numerical value indicating the Rx coordinate. For example, "coordinates $\alpha 1$" indicate the coordinates corresponding to "the Rx coordinate 1 of the column $\alpha$", that is, "the Rx coordinate 1 of the Tx coordinate (G-H)".

FIG. 26 is a diagram of a fourth matrix Ma4 derived by return processing based on the third matrix Ma3. The signal processor 33 performs return processing based on the third matrix Ma3. Specifically, the signal processor 33 performs arithmetic processing based on the values of the rows included in the columns $\alpha$, $\beta$, $\Gamma$, $\Delta$, $\eta$, $\theta$, and $\kappa$ in the third matrix Ma3 (refer to FIG. 25). More specifically, the signal processor 33 employs the column $\alpha$ (refer to FIG. 25) as the rightmost column of the fourth matrix Ma4 without any change. The column $\alpha$ (refer to FIG. 25) applied to the fourth matrix Ma4 is defined as a column n (refer to FIG. 26).

The values of the rows in the column $\pi$ are the same as the values of the rows in the column $\alpha$. Consequently, the values of the rows in the column $\alpha$ (coordinates $\alpha 1$, $\alpha 2$, . . . , and $\alpha 8$) are applied to the values of the rows in the column $\pi$ (coordinates $\pi 1$, $\pi 2$, . . . , and $\pi 8$) without any change. In the example illustrated in FIG. 26, the values of the coordinates $\pi 1$, $\pi 2$, . . . , and $\pi 8$ are 0.

Subsequently, the signal processor 33 adds the column $\pi$ (refer to FIG. 26) and the column $\beta$ (refer to FIG. 25). The term "adding a first column and a second column" means adding the values of the rows in the first column and the values of the rows in the second column row by row. The signal processor 33 defines a column obtained by adding the column $\pi$ (refer to FIG. 26) and the column $\beta$ (refer to FIG.

25) as a column σ (refer to FIG. 26). The column σ is a column arranged on the left of the column π in the fourth matrix Ma4.

The values of the rows in the column σ are values obtained by adding the values of the rows in the column π (refer to FIG. 26) and the values of the rows in the column β (refer to FIG. 25) row by row. In the example illustrated in FIG. 26, the values of the coordinates π1, π2, . . . , and π8 are 0. In the example illustrated in FIG. 25, the values of the coordinates β2 and β4 are 5. The value of the coordinates β6 is 2. The values of the coordinates β1, β3, β5, β7, and β8 are 0. Consequently, the values of the coordinates σ2 and σ4 are 5 in the example illustrated in FIG. 26. The value of the coordinates σ6 is 2. The values of the coordinates σ, σ3, σ5, σ7, and σ8 are 0.

Subsequently, the signal processor 33 adds the column σ (refer to FIG. 26) and the column Γ (refer to FIG. 25). The signal processor 33 defines a column obtained by adding the column σ (refer to FIG. 26) and the column Γ (refer to FIG. 25) as a column φ (refer to FIG. 26). The column φ is a column arranged on the left of the column σ in the fourth matrix Ma4.

The values of the rows in the column φ are values obtained by adding the values of the rows in the column σ (refer to FIG. 26) and the values of the rows in the column Γ (refer to FIG. 25) row by row. In the example illustrated in FIG. 26, the values of the coordinates σ2 and σ4 are 5. The value of the coordinates σ6 is 2. The values of the coordinates σ1, σ3, σ5, σ7, and σ8 are 0. In the example illustrated in FIG. 25, the value of the coordinates Γ4 is −5. The value of the coordinates Γ6 is 1. The values of the coordinates Γ1, Γ2, β, Γ5, Γ7, and Γ8 are 0. Consequently, the value of the coordinates φ2 is 5 in the example illustrated in FIG. 26. The value of the coordinates φ6 is 3. The values of the coordinates φ1, φ2, φ3, φ5, φ7, and φ8 are 0.

Subsequently, the signal processor 33 adds the column φ (refer to FIG. 26) and the column Δ (refer to FIG. 25). The signal processor 33 defines a column obtained by adding the column φ (refer to FIG. 26) and the column Δ (refer to FIG. 25) as a column ψ (refer to FIG. 26). The column ψ is a column arranged on the left of the column φ in the fourth matrix Ma4.

The values of the rows in the column ψ are values obtained by adding the values of the rows in the column φ (refer to FIG. 26) and the values of the rows in the column Δ (refer to FIG. 25) row by row. In the example illustrated in FIG. 26, the value of the coordinates φ2 is 5. The value of the coordinates φ6 is 3. The values of the coordinates φ1, φ2, φ3, φ5, φ7, and φ8 are 0. In the example illustrated in FIG. 25, the value of the coordinates Δ6 is 1. The values of the coordinates Δ1, Δ2, Δ3, Δ4, Δ5, Δ7, and Δ8 are 0. Consequently, the value of the coordinates ψ2 is 5 in the example illustrated in FIG. 26. The value of the coordinates ψ6 is 4. The values of the coordinates ψ1, ψ2, ψ3, ψ5, ψ7, and ψ8 are 0.

Subsequently, the signal processor 33 adds the column ψ (refer to FIG. 26) and the column η (refer to FIG. 25). The signal processor 33 defines a column obtained by adding the column ψ (refer to FIG. 26) and the column η (refer to FIG. 25) as a column Ω (refer to FIG. 26). The column Ω is a column arranged on the left of the column ψ in the fourth matrix Ma4.

The values of the rows in the column Ω are values obtained by adding the values of the rows in the column ψ (refer to FIG. 26) and the values of the rows in the column η (refer to FIG. 25) row by row. In the example illustrated in FIG. 26, the value of the coordinates ψ2 is 5. The value of the coordinates ψ6 is 4. The values of the coordinates ψ1, ψ2, ψ3, ψ5, ψ7, and ψ8 are 0. In the example illustrated in FIG. 25, the value of the coordinates η4 is 5. The value of the coordinates η6 is 1. The values of the coordinates η1, η2, η3, η5, η7, and η8 are 0. Consequently, the values of the coordinates Ω2, Ω4, and Ω6 are 5 in the example illustrated in FIG. 26. The values of the coordinates Ω1, Ω3, Ω5, Ω7, and Ω8 are 0.

Subsequently, the signal processor 33 adds the column Ω (refer to FIG. 26) and the column θ (refer to FIG. 25). The signal processor 33 defines a column obtained by adding the column Ω (refer to FIG. 26) and the column θ (refer to FIG. 25) as a column μ (refer to FIG. 26). The column μ is a column arranged on the left of the column Ω in the fourth matrix Ma4.

The values of the rows in the column μ are values obtained by adding the values of the rows in the column Ω (refer to FIG. 26) and the values of the rows in the column θ (refer to FIG. 25) row by row. In the example illustrated in FIG. 26, the values of the coordinates Ω2, Ω4, and Ω6 are 5. The values of the coordinates Ω1, Ω3, Ω5, Ω7, and Ω8 are 0. In the example illustrated in FIG. 25, the values of the coordinates θ2, θ4, and θ6 are −5. The values of the coordinates θ1, θ3, θ5, θ7, and θ8 are 0. Consequently, the values of the coordinates μ1, μ2, . . . , and μ8 are 0 in the example illustrated in FIG. 26.

Subsequently, the signal processor 33 adds the column μ (refer to FIG. 26) and the column κ (refer to FIG. 25). The signal processor 33 defines a column obtained by adding the column μ (refer to FIG. 26) and the column κ (refer to FIG. 25) as a column ν (refer to FIG. 26). The column ν is a column arranged on the left of the column μ in the fourth matrix Ma4.

The values of the rows in the column ν are values obtained by adding the values of the rows in the column μ (refer to FIG. 26) and the values of the rows in the column κ (refer to FIG. 25) row by row. In the example illustrated in FIG. 26, the values of the coordinates μ1, μ2, . . . , and μ8 are 0. In the example illustrated in FIG. 25, the values of the coordinates κ1, κ2, . . . , and κ8 are 0. Consequently, the values of the coordinates ν1, ν2, . . . , and ν8 are 0 in the example illustrated in FIG. 26.

By the return processing, the fourth matrix Ma4 illustrated in FIG. 26 is derived from the third matrix Ma3 illustrated in FIG. 25, for example. FIG. 26 also illustrates a column ω. The column ω is a column obtained by adding the column ν (refer to FIG. 26) and the column λ (refer to FIG. 25). The processing of deriving the column ω can be omitted.

FIG. 27 is a diagram of touch detection results derived by adding that is based on the fourth matrix Ma4. The signal processor 33 performs adding that is based on the fourth matrix Ma4. Specifically, the signal processor 33 performs arithmetic processing based on the values of the rows included in the columns π, σ, φ, ψ, Ω, μ, and ν in the fourth matrix Ma4 (refer to FIG. 25). More specifically, the signal processor 33 determines the touch detection results at predetermined coordinates out of the coordinates in the detection region SA to be a predetermined initial value. The predetermined coordinates are the coordinates of "the other end in the array direction of the drive electrodes Tx" described above, and indicate the Tx coordinate "H" in FIG. 27. The initial value is a capacitance value obtained when an external object is not detected by the drive electrode Tx positioned at the predetermined coordinates. In FIG. 12, this value is "5", for example. In the explanation of the embodiment above, the "Tx coordinate corresponding to the other end in the array direction (second direction Dx) of the drive electrodes Tx" is the Tx coordinate H. Consequently, the values of the coordinates H1, H2, . . . , and H8 are 5 in the example illustrated in FIG. 27.

The signal processor 33 adds the initial value individually to the values of the coordinates included in the fourth matrix Ma4. The signal processor 33 sets the values obtained by adding the initial value individually to the values of the coordinates included in the fourth matrix Ma4 by shifting the values by one from an original Tx coordinate, respectively. The direction of shifting is toward one end in the second direction Dx. The calculated values are employed as the values indicating the touch detection results of the coordinates.

Consequently, the values (5, 5, . . . , and 5) of the coordinates G1, G2, . . . , and G8 are obtained by adding the initial value (5) to the values (0, 0, . . . , and 0) of the coordinates $\pi 1, \pi 2, \ldots$, and $\pi 8$ included in the column n in the fourth matrix Ma4.

The values (5, 10, 5, 5, 5, 7, 5, and 5) of the coordinates F1, F2, F3, F4, F5, F6, F7, and F8 are obtained by adding the initial value (5) to the values (0, 5, 0, 5, 0, 2, 0, and 0) of the coordinates $\sigma 1, \sigma 2, \sigma 3, \sigma 4, \sigma 5, \sigma 6, \sigma 7$, and $\sigma 8$ included in the column $\sigma$ in the fourth matrix Ma4.

The values (5, 10, 5, 5, 5, 8, 5, and 5) of the coordinates E1, E2, E3, E4, E5, E6, E7, and E8 are obtained by adding the initial value (5) to the values (0, 5, 0, 0, 0, 3, 0, and 0) of the coordinates $\phi 1, \phi 2, \phi 3, \phi 4, \phi 5, \phi 6, \phi 7$, and $\phi 8$ included in the column $\phi$ in the fourth matrix Ma4.

The values (5, 10, 5, 5, 5, 9, 5, and 5) of the coordinates D1, D2, D3, D4, D5, D6, D7, and D8 are obtained by adding the initial value (5) to the values (0, 5, 0, 0, 0, 4, 0, and 0) of the coordinates $\psi 1, \psi 2, \psi 3, \psi 4, \psi 5, \psi 6, \psi 7$, and $\psi 8$ included in the column $\psi$ in the fourth matrix Ma4.

The values (5, 10, 5, 10, 5, 10, 5, and 5) of the coordinates C1, C2, C3, C4, C5, C6, C7, and C8 are obtained by adding the initial value (5) to the values (0, 5, 0, 5, 0, 5, 0, and 0) of the coordinates $\Omega 1, \Omega 2, \Omega 3, \Omega 4, \Omega 5, \Omega 6, \Omega 7$, and $\Omega 8$ included in the column $\Omega$ in the fourth matrix Ma4.

The values (5, 5, . . . , and 5) of the coordinates B1, B2, . . . , and B8 are obtained by adding the initial value (5) to the values (0, 0, . . . , and 0) of the coordinates $\mu 1, \mu 2, \ldots$, and $\mu 8$ included in the column $\mu$ in the fourth matrix Ma4.

The values (5, 5, . . . , and 5) of the coordinates A1, A2, . . . , and A8 are obtained by adding the initial value (5) to the values (0, 0, . . . , and 0) of the coordinates $\nu 1, \nu 2, \ldots$, and $\nu 8$ included in the column $\nu$ in the fourth matrix Ma4.

By the adding, the touch detection results illustrated in FIG. 27 are derived from the fourth matrix Ma4 illustrated in FIG. 26, for example. The touch detection results illustrated in FIG. 27 are the same as the touch detection results according to the reference example described with reference to FIG. 12. The range from the Tx coordinate A to the Tx coordinate G excluding the Tx coordinate H out of the coordinates illustrated in FIG. 27 can be considered as a fifth matrix Ma5 derived based on the fourth matrix Ma4.

The column $\omega$ illustrated in FIG. 26 is not used in the adding. Consequently, it is not necessary to derive the column $\lambda$ (refer to FIG. 25) used only to derive the column $\omega$. As described above, to derive the touch detection results in the detection region SA, the signal processor 33 does not use and discards the coordinates corresponding to the combination of the drive electrodes Tx positioned at both ends in the array direction of the drive electrodes Tx out of the drive electrodes Tx in deriving the touch detection signals.

In deriving the touch detection results according to the embodiment described above, noise generated in a certain column may possibly affect other columns in the return processing. If the values included in the column $\pi$ of the fourth matrix Ma4 have an error due to effects of noise, the other columns also have an error due to the effects of noise, such as the column $\sigma$ derived by adding the column $\pi$ and the column $\beta$, and the column $\phi$ derived by adding the column $\sigma$ and the column $\Gamma$.

To address this, in the embodiment, the signal processor 33 performs moving average processing. The moving average processing is processing performed to reduce the effects of noise considering the possibility that the noise affects a plurality of columns by the return processing.

Figure 28:
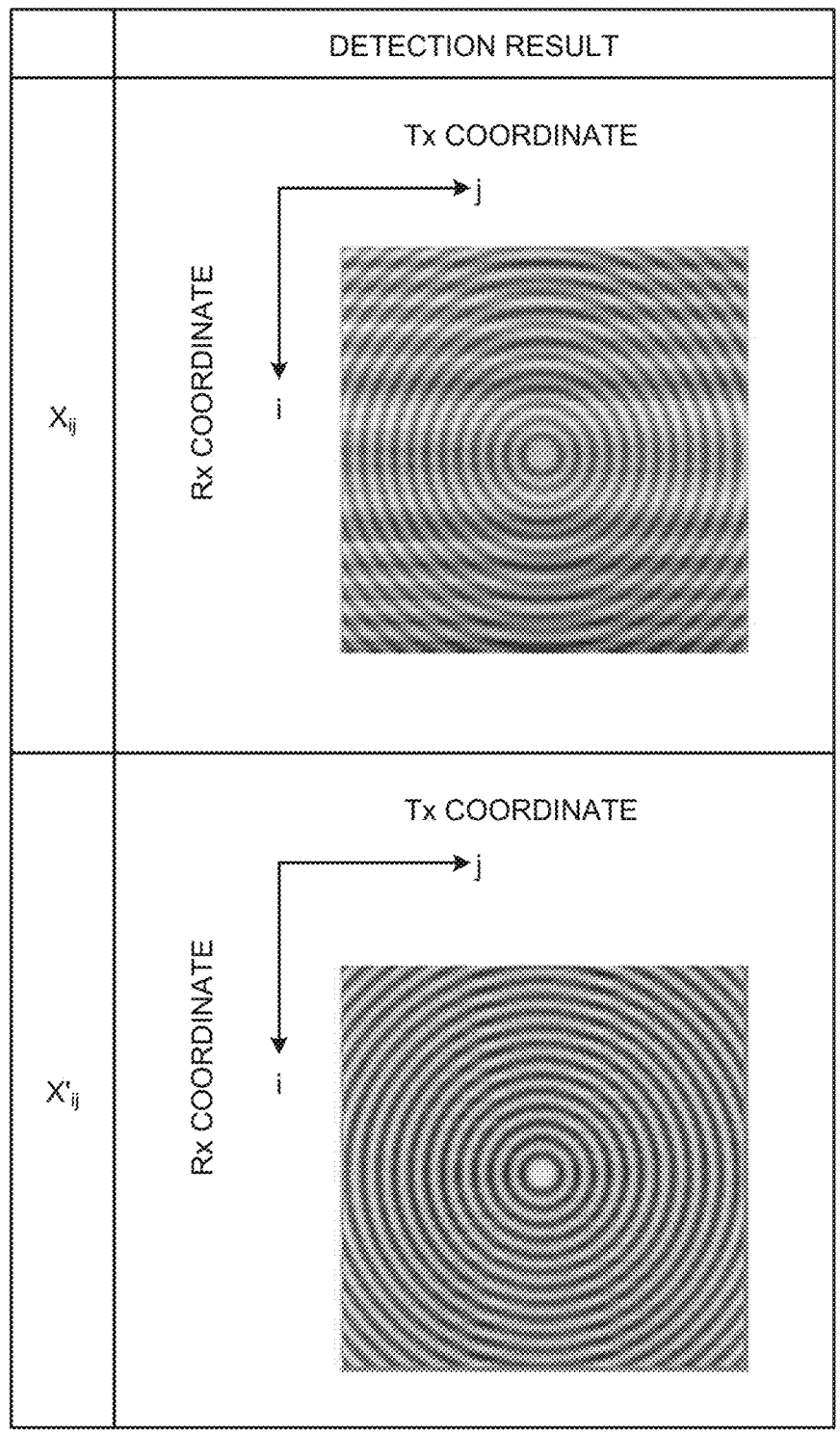
FIG. 28 is a schematic of touch detection results before and after moving average processing.

FIG. 28 is a schematic of the touch detection results before and after the moving average processing. FIG. 28 illustrates two-dimensional images of an example of a touch detection result $X_{ij}$ before the moving average processing and an example of a touch detection result $X'_{ij}$ after the moving average processing. The touch detection result $X_{ij}$ before the moving average processing is a touch detection result derived by the adding described above. In FIG. 28, the Tx coordinate is represented by j, and the Rx coordinate is represented by i.

The signal processor 33 performs the moving average processing on the touch detection result $X_{ij}$ before the moving average processing to derive the touch detection result $X'_{ij}$ after the moving average processing. Specifically, the signal processor 33 uses the following Expression (1) to derive the touch detection result $X'_{ij}$ after the moving average processing from the touch detection result $X_{ij}$ before the moving average processing. The range of the values of i in Expression (1) corresponds to the number of detection electrodes Rx. When the number of detection electrodes Rx is r, i takes a range of 0 to (r−1). The range of the values of j in Expression (1) corresponds to the number of drive electrodes Tx. When the number of drive electrodes Tx is $2^n$, j takes a range of 0 to ($2^n$−1). In Expression (1), m is a predetermined value. Specifically, m is a natural number smaller than one half of the number of drive electrodes Tx.

$$X'_{i,j} = X_{ij} - \frac{1}{2m+1} \sum_{k=j-m}^{j+m} X_{i,k} \quad (1)$$

Figure 29:
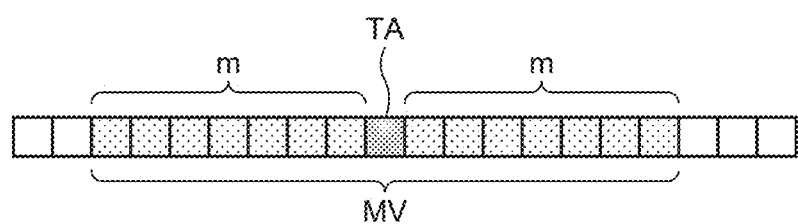
FIG. 29 is a schematic of the relation between a coordinate to be subjected to the moving average processing and a range including other coordinates referred to in the moving average processing for the touch detection result of the coordinate.

FIG. 29 is a schematic of the relation between a coordinate TA to be subjected to the moving average processing and a range MV including other coordinates referred to in the moving average processing for the touch detection result of the coordinate TA. As illustrated in FIG. 29, the following Expression (2) expresses the average of the values indicating the touch detection results of the range MV including the other coordinates within a range of m in the array direction of the drive electrodes Tx with respect to the coordinate TA in the detection region SA. Expression (2) corresponds to the function subtracted from the touch detection result $X_{ij}$ in the right side of Expression (1).

$$MV = \frac{1}{2m+1} \sum_{k=j-m}^{j+m} X_{i,k} \quad (2)$$

While FIG. 29 illustrates an example where m=7 is satisfied, m is not limited thereto and can be changed as appropriate.

By performing the moving average processing, the touch detection result $X'_{ij}$ after the moving average processing is derived from the touch detection result $X_{ij}$ before the moving average processing in FIG. 28. In the touch detection result $X_{ij}$ before the moving average processing, a striped pattern along the direction of the Tx coordinate (j) appears. This pattern is generated by the effects of noise acting on a plurality of columns due to the return processing described above. By contrast, in the touch detection result $X'_{ij}$ after the moving average processing, the striped pattern appearing in the touch detection result $X_{ij}$ before the moving average processing is suppressed to a degree that it is hard to recognize. As described above, the moving average processing can further reduce the effects of noise.

As described above, the detecting device 100 according to the embodiment includes the drive electrodes Tx, the detection electrode Rx, the drive circuit 10, and the detector 103. The drive electrodes Tx extend in the first direction Dy and are arrayed in the second direction Dx. The detection electrode Rx faces the drive electrodes Tx in the third direction Dz. The drive circuit 10 supplies drive signals to the drive electrodes Tx. The detector 103 detects proximity of an object (e.g., the finger Fin) to the detection region SA provided with the detection electrode Rx based on an output from the detection electrode Rx generated according to the capacitance Cap generated between the drive electrodes Tx and the detection electrode Rx due to the drive signals. The drive circuit 10 performs a predetermined number of phases (e.g., the phases P1, P2, P3, P4, P5, P6, P7, and P8) for simultaneously supplying the drive signals to the drive electrodes Tx in a period of time when the detector 103 performs detection once. The predetermined number corresponds to the number of drive electrodes Tx supplied with the drive signals. The predetermined number is equal to the number of drive electrodes Tx. The drive circuit 10 supplies one of a drive signal having a relatively high potential (e.g., the positive (1) potential) and a drive signal having a relatively low potential (e.g., the negative (−1) potential) to the drive electrodes Tx in each of the phases based on a positive or negative polarity of a value included in a predetermined matrix (e.g., the Hadamard matrix Had1). The drive circuit 10 performs inversion drive of supplying the drive signals having different potentials in units of two of the drive electrodes Tx adjacent to each other. When one half of the predetermined number of phases is the first drive period, and the other half of the predetermined number of phases not included in the first drive period is the second drive period, the relation between the electric potentials of the drive signals and the drive electrodes Tx in the second drive period is a relation obtained by shifting the relation between the electric potentials of the drive signals and the drive electrodes Tx in the first drive period by one drive electrode Tx in the second direction Dx. The relation between the electric potentials of the drive signals and the drive electrodes Tx in the first drive period corresponds to the combinations of positive and negative polarities of the electric potentials of the drive signals supplied to the drive electrodes Tx as illustrated in FIGS. 8 and 9, for example. The relation between the electric potentials of the drive signals and the drive electrodes Tx in the second drive period corresponds to the combinations of positive and negative polarities of the electric potentials of the drive signals supplied to the drive electrodes Tx as illustrated in FIGS. 10 and 11, for example. By performing the inversion drive, different drive signals are supplied to two drive electrodes Tx adjacent to each other. As a result, the embodiment obtains outputs from the detection electrodes Rx that can be considered to be generated by difference drive on the two drive electrodes Tx. Consequently, the embodiment can perform detection with higher sensitivity than in a case where a single drive electrode Tx is driven. In addition, the combinations of the drive electrodes Tx supplied with different potentials as a target of inversion drive are shifted by one drive electrode Tx in the second direction Dx between the first drive period and the second drive period. This mechanism compensates reduction in resolution caused by performing difference drive on the two drive electrodes Tx in the inversion drive. Consequently, the embodiment can perform detection with higher sensitivity by increasing the signal strength while suppressing reduction in resolution.

If the detection region SA is integrated with an image display region of a display device, such as a liquid crystal display, the embodiment is particularly effective because the difference drive described above can reduce the effects of noise generated by elements included in the display device.

The predetermined matrix is a Hadamard matrix (e.g., the Hadamard matrix Had1), and the number of elements in the row and column directions of the Hadamard matrix is one half of the number of drive electrodes Tx. Thus, the embodiment enables the drive circuit 10 to drive the drive electrodes Tx in a simpler manner by using the Hadamard matrix based on the number of drive electrodes Tx.

The signal processor 33 of the detector 103 derives a first matrix (e.g., the first matrix Ma1) by arithmetic processing including an operation of multiplying a matrix (e.g., the matrix MaA) in which numerical values corresponding to the output from the detection electrode Rx in the first drive period are arranged in the column direction in the order of execution of the phases included in the first drive period by the predetermined matrix (e.g., the Hadamard matrix Had1). The signal processor 33 derives a second matrix (e.g., the second matrix Ma2) by arithmetic processing including an operation of multiplying a matrix (e.g., the matrix MaB) in which numerical values corresponding to the output from the detection electrode Rx in the second drive period are arranged in the column direction in the order of execution of the phases included in the second drive period by the predetermined matrix. The signal processor 33 also derives a third matrix (e.g., the third matrix Ma3) in which the columns included in the first matrix and the columns included in the second matrix are alternately arranged in the column direction and detects proximity of an object to the detection region SA based on the third matrix. With this mechanism, the embodiment can secure the resolution of detection by combining the resolution of detection in the detection region SA based on the output from the detection electrode Rx in the first drive period and the resolution of detection in the detection region SA based on the output from the detection electrode Rx in the second drive period. Consequently, the embodiment can secure the detection accuracy.

The third matrix (e.g., the third matrix Ma3) does not include a column corresponding to a combination of the drive electrodes Tx (e.g., the combination of the drive electrode Tx at the Tx coordinate A and the drive electrode Tx at the Tx coordinate H) not adjacent to each other in the inversion drive out of the columns included in the first matrix (e.g., the first matrix Ma1) and the columns included in the second matrix (e.g., the second matrix Ma2). This combination does not substantially contribute to securing the detection accuracy. Consequently, not including the combination can reduce the processing load of the signal processor 33.

The signal processor 33 of the detector 103 performs return processing of defining the first column of the third matrix (e.g., the third matrix Ma3) as the first column of the fourth matrix (e.g., the fourth matrix Ma4) and defining a column obtained by adding the (q−1)-th column of the fourth matrix and the q-th column of the third matrix as the q-th column of the fourth matrix. The return processing is performed the number of times required to substitute all the natural numbers within a range of 2 to the number of drive electrodes (e.g., $2^n$) to q, and the values substituted for q in the return processing are different from each other. Thus, the embodiment can derive outputs corresponding to the touch detection results at the respective coordinates corresponding to the intersections of the drive electrodes Tx and the detection electrodes Rx in the detection region SA based on the difference drive results derived in the third matrix.

The signal processor 33 of the detector 103 employs the elements of the fifth matrix (e.g., the fifth matrix Ma5) derived by adding a predetermined initial value to the elements included in the fourth matrix (e.g., the fourth matrix Ma4) as the values indicating the touch detection results in the detection region SA. The initial value is a value corresponding to the capacitance obtained when there is no proximity of the object. Thus, the embodiment can more reliably restore the values of the touch detection results based on the capacitance.

The signal processor 33 of the detector 103 performs moving average processing. The embodiment treats the average of the value of a certain element included in the fifth matrix (e.g., the fifth matrix Ma5) and the values of a predetermined number of other elements arrayed in the column direction with respect to the certain element as the value of the certain element after the moving average processing. Thus, the embodiment can further reduce the effects of noise generated in one part of the detection region SA and acting on the other part.

The number of drive electrodes Tx is $2^n$. n is a natural number of 2 or larger. This configuration can facilitate deriving the Hadamard matrix based on the number of drive electrodes Tx.

The detecting device 100 includes a plurality of the detection electrodes Rx extending in the second direction Dx and arrayed in the first direction Dy. With this configuration, the detection region SA can be formed in which the intersections of the drive electrodes Tx and the detection electrodes Rx are arranged in a matrix (row-column configuration) in planar view. Consequently, the embodiment can perform two-dimensional detection with higher sensitivity.

The number of phases included in the touch detection period is the number of drive electrodes Tx. The number of drive electrodes Tx and the number of detection electrodes Rx are not limited to eight. The number of drive electrodes Tx simply needs to be a number ($2^n$) that satisfies the Hadamard matrix Had1 in which both the number of row elements (combinations of the drive electrodes Tx) and the number of column elements (phases) are $2^{(n-1)}$. The number of detection electrodes Rx simply needs to be a natural number of 1 or larger. The detection electrodes Rx do not necessarily extend in a direction orthogonal to the drive electrodes Tx in planar view. The detection electrodes Rx simply needs to intersect the drive electrodes Tx in planar view. The array direction of the detection electrodes Rx is not limited to the extending direction of the drive electrodes Tx and can be changed as appropriate.

The following describes, with reference to FIGS. 30 and 31, examples of a Hadamard matrix employed as the Hadamard matrix Had1 described with reference to FIGS. 8 and 9 when n=4 is satisfied.

FIGS. 30 and 31 are diagrams of the examples of the Hadamard matrix when n=4 is satisfied. In the Hadamard matrices illustrated in FIGS. 30 and 31, the row direction represents the Tx coordinates corresponding to the array direction of the drive electrodes Tx, and the column direction represents the number of phases in the first drive period and the second drive period.

In the matrices illustrated in FIGS. 30 and 31, the sum of the values in the first column is $2^{(n-1)}=2^3=8$. In the matrices illustrated in FIGS. 30 and 31, the sum of the values in each of the columns other than the first column is 0. The matrices illustrated in FIGS. 30 and 31 are matrices the matrix product of which is obtained by multiplying an identity matrix by 8. Generally, in a Hadamard matrix with an order of $2^{(n-1)}$ based on a natural number n of 2 or larger, the sum of the values in the first column is $2^{(n-1)}=2^3=8$, and the sum of the values in each of the columns other than the first column is 0. The Hadamard matrix with an order of $2^{(n-1)}$ is a matrix the matrix product of which is obtained by multiplying an identity matrix by $2^{(n-1)}$. In other words, any Hadamard matrix with an order of $2^{(n-1)}$ that satisfies these conditions of the sum of each column and the matrix product can be employed as the Hadamard matrix Had1 when the number of drive electrodes Tx is $2^n$. Consequently, an algorithm for specifically generating the Hadamard matrix with an order of $2^{(n-1)}$ is not particularly limited. The Hadamard matrix illustrated in FIG. 30, for example, is a Hadamard matrix according to what is called the Sylvester's construction. The Hadamard matrix illustrated in FIG. 31 is a Hadamard matrix (Paley matrix) according to the Paley's construction.

The detecting device 100 has resolution corresponding to the definition of the matrix (row-column configuration) formed by the intersections of the drive electrodes Tx and the detection electrodes Rx in planar view. If the definition is sufficiently high to detect protrusions and recesses of a fingerprint, the detecting device 100 can detect not only proximity of the finger Fin but also the fingerprint of the finger Fin.

While the description above determines all the drive electrodes Tx of the detecting device 100 to be targets supplied with the drive signals, the embodiment is not limited thereto. The embodiment, for example, may determine certain drive electrodes Tx out of the drive electrodes Tx provided in the detection region SA to be targets supplied with the drive signals and operate part of the detection region SA provided with the detection electrodes Rx intersecting the certain drive electrodes Tx in planar view. In other words, it is not necessary to drive all the drive electrodes Tx that are physically provided, and the number of phases simply needs to be a predetermined number corresponding to the number of drive electrodes Tx supplied with the drive signals.

Out of other advantageous effects achieved by the aspects described in the present embodiment, advantageous effects clearly defined by the description in the present specification or appropriately conceivable by those skilled in the art are naturally achieved by the present disclosure.

What is claimed is:

1. A detecting device comprising:
   a plurality of drive electrodes extending in a first direction and arrayed in a second direction;
   a detection electrode facing the drive electrodes in a direction orthogonal to the first direction and the second direction;
   a drive circuit configured to supply drive signals to the drive electrodes; and
   a detector configured to detect proximity of an object to a detection region provided with the detection electrode based on an output from the detection electrode generated according to capacitance generated between the drive electrodes and the detection electrode due to the drive signals, wherein the drive circuit performs a predetermined number of phases for simultaneously supplying the drive signals to the drive electrodes in a period of time when the detector performs detection once and performs inversion drive, the predetermined number corresponding to number of drive electrodes supplied with the drive signals, the inversion drive supplying the drive signals having potentials of reverse polarities in units of two of the drive electrodes adjacent to each other and supplying to the drive electrodes in each of the phases, one of the drive signals having a first potential or having a second potential lower than the first potential based on a positive or negative polarity of a value included in a predetermined matrix, and when a first half of the predetermined number of phases is a first drive period, and a second half of the predetermined number of phases not included in the first drive period is a second drive period, polarities of the drive signals supplied to a drive electrode in the second drive period are same as polarities supplied to an adjacent one of the drive electrodes in the second direction in the first drive period, and polarities of the drive signals supplied to a first one of the drive electrodes in the second direction in the second drive period are same as the polarities supplied to a last one of the drive electrodes in the second direction in the first drive period.

2. The detecting device according to claim 1, wherein the predetermined matrix is a Hadamard matrix, and number of elements in row and column directions of the Hadamard matrix is one half of the number of drive electrodes.

3. The detecting device according to claim 1, wherein the detector derives a first matrix by arithmetic processing including an operation of multiplying a matrix in which numerical values corresponding to the output in the first drive period are arranged in a column direction in order of execution of the phases included in the first drive period by the predetermined matrix, the detector derives a second matrix by arithmetic processing including an operation of multiplying a matrix in which numerical values corresponding to the output in the second drive period are arranged in a column direction in order of execution of the phases included in the second drive period by the predetermined matrix, the detector derives a third matrix in which columns included in the first matrix and columns included in the second matrix are alternately arranged in a column direction, and the detector detects proximity of the object to the detection region based on the third matrix.

4. The detecting device according to claim 3, wherein the third matrix does not include a column corresponding to a combination of the drive electrodes not adjacent to each other and positioned at both ends in the second direction in the inversion drive out of the columns included in the first matrix and the columns included in the second matrix.

5. The detecting device according to claim 3, wherein the detector performs return processing including:
 defining a first column of the third matrix as a first column of a fourth matrix; and
 defining a column obtained by adding a (q−1)-th column of the fourth matrix and a q-th column of the third matrix as a q-th column of the fourth matrix, the return processing is performed number of times required to substitute all natural numbers within a range of 2 to the number of drive electrodes to q, and values substituted for q in the return processing are different from each other.

6. The detecting device according to claim 5, wherein the detector employs elements of a fifth matrix derived by adding a predetermined initial value to elements included in the fourth matrix as values indicating a touch detection result in the detection region, and the initial value is a value corresponding to the capacitance obtained when there is no proximity of the object.

7. The detecting device according to claim 6, wherein the detector performs moving average processing, and an average of a value of a certain element included in the fifth matrix and values of a predetermined number of other elements arrayed in a column direction with respect to the certain element is treated as a value of the certain element after the moving average processing.

8. The detecting device according to claim 1, wherein the number of drive electrodes is $2^n$, and $n$ is a natural number of 2 or larger.

9. The detecting device according to claim 1, further comprising a plurality of the detection electrodes extending in the second direction and arrayed in the first direction.

10. A detecting device comprising:

a plurality of drive electrodes extending in a first direction and arrayed in a second direction;

a detection electrode facing the drive electrodes in a direction orthogonal to the first direction and the second direction; and a drive circuit configured to supply a drive signal to the drive electrodes, wherein the drive circuit performs a predetermined number of phases for simultaneously supplying the drive signals to the drive electrodes and performs inversion drive, the predetermined number corresponding to number of drive electrodes supplied with the drive signals, the inversion drive supplying the drive signals having potentials of reverse polarities in units of two of the drive electrodes adjacent to each other and supplying to the drive electrodes in each of the phases, one of the drive signals having a first potential or having a second potential lower than the first potential based on a positive or negative polarity of a value included in a predetermined matrix, and when a first half of the predetermined number of phases is a first drive period, and a second half of the predetermined number of phases not included in the first drive period is a second drive period, polarities of the drive signals supplied to a drive electrode in the second drive period are same as polarities supplied to an adjacent one of the drive electrodes in the second direction in the first drive period, and polarities of the drive signals supplied to a first one of the drive electrodes in the second direction in the second drive period are same as the polarities supplied to a last one of the drive electrodes in the second direction in the first drive period.

11. The detecting device according to claim 10, wherein the predetermined matrix is a Hadamard matrix, and number of elements in row and column directions of the Hadamard matrix is one half of the number of drive electrodes.

* * * * *